United States Patent
Abraham et al.

(10) Patent No.: US 9,124,347 B2
(45) Date of Patent: Sep. 1, 2015

(54) SYSTEMS AND METHODS FOR COMMUNICATION IN A WHITE SPACE

(75) Inventors: Santosh Paul Abraham, San Diego, CA (US); Stephen J. Shellhammer, Ramona, CA (US)

(73) Assignee: QUALCOMM Incorporated, San Diego, CA (US)

(*) Notice: Subject to any disclaimer, the term of this patent is extended or adjusted under 35 U.S.C. 154(b) by 474 days.

(21) Appl. No.: 13/438,355

(22) Filed: Apr. 3, 2012

(65) Prior Publication Data
US 2013/0090071 A1   Apr. 11, 2013

Related U.S. Application Data

(60) Provisional application No. 61/471,613, filed on Apr. 4, 2011, provisional application No. 61/472,034, filed on Apr. 5, 2011.

(51) Int. Cl.
*H04B 1/38* (2015.01)
*H04W 16/14* (2009.01)
*H04W 48/14* (2009.01)

(52) U.S. Cl.
CPC ............ *H04B 1/38* (2013.01); *H04W 16/14* (2013.01); *H04W 48/14* (2013.01)

(58) Field of Classification Search
CPC ...... H04W 52/04; H04W 52/322; H04B 1/38; H04B 1/40; H04B 1/406
USPC .................................................. 455/522, 73
See application file for complete search history.

(56) References Cited

U.S. PATENT DOCUMENTS

| | | | |
|---|---|---|---|
| 8,068,826 B2* | 11/2011 | Kuffner et al. | 455/423 |
| 8,290,067 B2* | 10/2012 | Cleveland | 375/260 |
| 2009/0197627 A1* | 8/2009 | Kuffner et al. | 455/522 |
| 2010/0246506 A1* | 9/2010 | Krishnaswamy | 370/329 |
| 2011/0124291 A1* | 5/2011 | Gurney et al. | 455/63.2 |
| 2011/0134855 A1* | 6/2011 | Fujii et al. | 370/329 |
| 2011/0158147 A1* | 6/2011 | Li et al. | 370/312 |
| 2011/0182257 A1* | 7/2011 | Raveendran et al. | 370/329 |
| 2011/0188486 A1* | 8/2011 | Kim et al. | 370/338 |
| 2011/0194542 A1* | 8/2011 | Kim et al. | 370/338 |
| 2011/0243078 A1* | 10/2011 | Kim et al. | 370/329 |

FOREIGN PATENT DOCUMENTS

JP       2012134650 A       7/2012

OTHER PUBLICATIONS

Anonymous: "Wireless LAN Medium Access Control (MAC) and Physical Layer (PHY) specifications. Amendment 2: TV White Spaces Operation", IEEE P802.11AF /D0.09, No. Part 11, Jan. 1, 2011, pp. 1-159, XP007918708.

(Continued)

*Primary Examiner* — April G Gonzales
(74) *Attorney, Agent, or Firm* — Kevin T. Cheatham

(57) ABSTRACT

Systems, methods, and devices to communicate in a white space are described herein. In some aspects, wireless communication transmitted in the white space authorizes an initial transmission by a device. The wireless communication may include power information for determining a power at which to transmit the initial transmission. The initial transmission may be used to request information identifying one or more channels in the white space available for transmitting data.

64 Claims, 14 Drawing Sheets

(56) References Cited

OTHER PUBLICATIONS

Draft P802.11z_D2.0, IEEE Standard for Information Technology—Telecommunications and Information Exchange Between Systems—Local and Metropolitan Area Networks—Specific Requirements, Part 11: Wireless LAN Medium Access Control (MAC) and Physical Layer (PHY) Specifications, Amendment 7: Extension to Direct-Link Setup (DLS) (Sep. 30, 2010).

IEEE 802.11-2007, "IEEE Standard for Information Technology—Telecommunications and Information Exchange Between Systems—Local and Metropolitan Area Networks—Specific Requirements", Part 11: Wireless LAN Medium Access Control (MAC) and Physical Layer (PHY) Specifications, (Jun. 12, 2007).

IEEE P802.11af/D1.0, Draft Standard for Information Technology—Telecommunications and information exchange between systems—Local and metropolitan area networks—Specific requirements—Part 11: Wireless LAN Medium Access Control (MAC) and Physical Layer (PHY) specifications Amendment 2: TV White spaces Operation, pp. 1-159 (Jan. 2011).

International Search Report and Written Opinion—PCT/US2012/032226—ISA/EPO—May 31, 2012.

Lan et al., "Normative Text for Deployment Scenarios and Signalling Method for Enablement", IEEE P802.11 Wireless LANs Sep. 6, 2010, pp. 1-3, XP002673438, Retrieved from the Internet: URL:https://mentor.ieee.org/802.ll/dcn/10/ 11-10-1037-00-00af-normative-text-for-deployment-scenarios-and-signalling-methods-fo r-enablement.doc [retrieved on Apr. 4, 2012].

Chen S et al., "Enabling Procedure of Communication in TVWS under FCC Rules", IEEE 802.11-10/261r2, Mar. 2010, slides 1-8, URL, https://mentor.ieee.org/802.11/dcn/10/11-10-0261-02-00af-enabling-procedure-of-communication-in-tvws-under-fcc-rules.ppt.

* cited by examiner

| 306 | | | |
|---|---|---|---|
| Location A | Frequency Band 1 | Primary User Identifying Information A1 | Power Information A1 |
| | Frequency Band 2 | Primary User Identifying Information A2 | Power Information A2 |
| | ⋮ | ⋮ | ⋮ |
| | Frequency Band N | Primary User Identifying Information AN | Power Information AN |
| Location B | Frequency Band 1 | Primary User Identifying Information B1 | Power Information B1 |
| | Frequency Band 2 | Primary User Identifying Information B2 | Power Information B2 |
| | ⋮ | ⋮ | ⋮ |
| | Frequency Band N | Primary User Identifying Information BN | Power Information BN |
| ⋮ | ⋮ | ⋮ | ⋮ |
| Location Z | Frequency Band 1 | Primary User Identifying Information Z1 | Power Information Z1 |
| | Frequency Band 2 | Primary User Identifying Information Z2 | Power Information Z2 |
| | ⋮ | ⋮ | ⋮ |
| | Frequency Band N | Primary User Identifying Information ZN | Power Information ZN |

FIG. 4

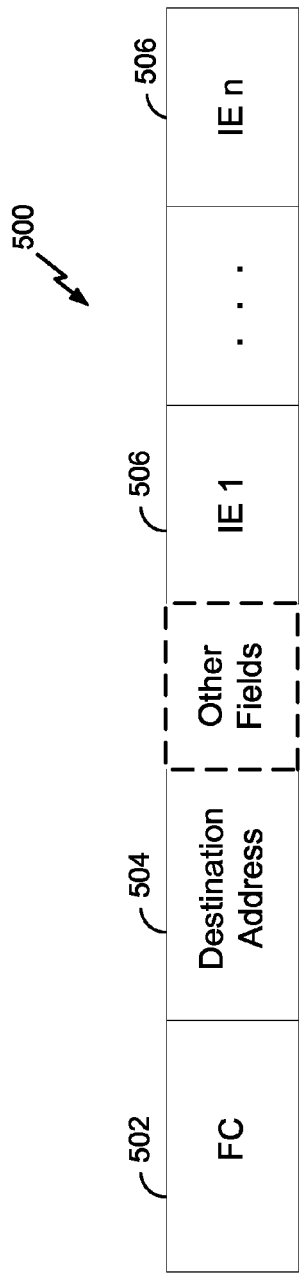
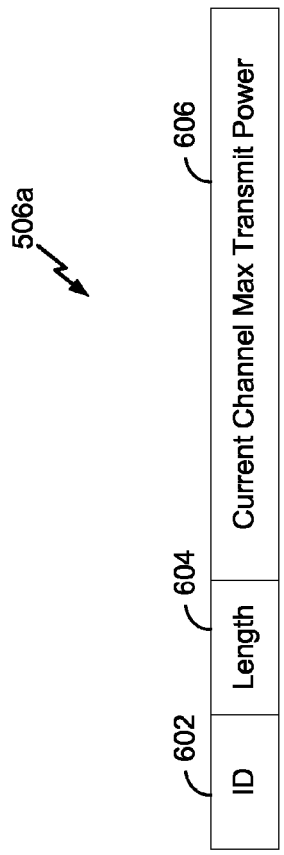
FIG. 5
FIG. 6A

FIG. 6B (506b)

| ID (602) | Length (604) | Device Class/Type 1 (614) | Current Channel Max Transmit Power For Device Class 1 (616) | Device Class/Type 2 (614) | Current Channel Max Transmit Power For Device Class 2 (616) | — — — | Device Class/Type n (614) | Current Channel Max Transmit Power For Device Class n (616) |
|---|---|---|---|---|---|---|---|---|

FIG. 6C (506c)

| ID (602) | Length (604) | Channel ID 1 (622) | Max Transmit Power for Channel ID1 (626) | Channel ID 2 (622) | Max Transmit Power for Channel ID2 (626) | — — — | Channel ID n (622) | Max Transmit Power for Channel ID n (626) |
|---|---|---|---|---|---|---|---|---|

FIG. 6D (506d)

| ID (602) | Length (604) | Channel ID 1 (632) | Device Class/Type 1 (634) | Max Transmit Power for Device Type 1 in Channel ID1 (636) | Device Class/Type 2 (634) | Max Transmit Power for Device Type 2 in Channel ID1 (636) | — — — | Device Class/Type k (634) | Max Transmit Power for Device Type k in Channel ID1 (636) |
|---|---|---|---|---|---|---|---|---|---|

| Channel ID n (632) | ... | Max Transmit Power for Device Type m in Channel IDn (636) |
|---|---|---|

SYSTEMS AND METHODS FOR COMMUNICATION IN A WHITE SPACE

CROSS-REFERENCE TO RELATED APPLICATIONS

This application claims priority under 35 U.S.C. §119(e) to U.S. Provisional application No. 61/471,613, filed Apr. 4, 2011, and U.S. Provisional application No. 61/472,034, filed Apr. 5, 2011, both of which are incorporated by reference herein in its entirety.

BACKGROUND

1. Field

The present application relates generally to wireless communications, and more specifically to systems, methods, and devices for communicating in a white space. For example, certain aspects herein may relate to communication in a television (TV) white space (TVWS), and to communication of power information for the TVWS.

2. Background

The popularity of high-rate wireless data services is increasing the demand for access to available frequency spectrum by both organized and ad hoc wireless networks. Ability to satisfy the demand is often limited by a lack of available frequency spectrum that may be used for reliable communications within a geographic area. Given the limitations of the natural frequency spectrum and models of licensing spectrum adopted in many countries, it is challenging to accommodate the increasing demand for spectrum access.

In many countries, the available frequency spectrum has been divided into a number of licensed and unlicensed frequency bands. Wireless cellular networks and some television channel transmissions typically operate in a licensed frequency band. For example, a network operator may be a licensee of a particular licensed band. As a licensee, the network operator may be allowed to exclude other potential users, for example so that non-authorized sources of interference are reduced.

A drawback of such licensed spectrum model is that it can lead to under-utilization of certain frequency bands. For example, there may be fewer licensees in certain areas than there are available licenses. Frequencies that are subject to license or otherwise allocated for use, but are unlicensed or unused in a certain area, may be referred to as a white space.

Communicating over one or more channels in the white space may increase the utilization of a frequency band, and/or may increase the efficiency of wireless communications. For example, one or more frequencies in the white space may be chosen for communication in order to take advantage of beneficial properties of the frequencies, and/or to alleviate congestion on other frequencies. Thus, improved systems, methods, and devices for communicating in a white space are desired.

SUMMARY

The systems, methods, and devices of the invention each have several aspects, no single one of which is solely responsible for its desirable attributes. Without limiting the scope of this invention as expressed by the claims which follow, some features will now be discussed briefly. After considering this discussion, and particularly after reading the section entitled "Detailed Description" one will understand how the features of this invention provide advantages that include communicating in a white space.

One aspect of the disclosure provides an apparatus for wireless communication. The apparatus comprises a receiver configured to receive a wireless communication in a channel of a white space. The wireless communication may authorize an initial transmission and identify transmit power information for communicating in the white space. The apparatus further comprises a transmitter configured to wirelessly transmit a request for information identifying one or more channels in the white space for transmitting data. The request may be transmitted with a power that is based at least in part on the transmit power information received in the wireless communication.

Another aspect of the disclosure provides a method for wireless communication. The method comprises a receiving a wireless communication in a channel of a white space. The wireless communication may authorize an initial transmission and identify transmit power information for communicating in the white space. The method further comprises wirelessly transmitting a request for information identifying one or more channels in the white space for transmitting data. The request may be transmitted with a power that is based at least in part on the transmit power information received in the wireless communication.

Another aspect of the disclosure provides an apparatus for wireless communication. The apparatus comprises means for receiving a wireless communication in a channel of a white space. The wireless communication may authorize an initial transmission and identify transmit power information for communicating in the white space. The apparatus further comprises means for wirelessly transmitting a request for information identifying one or more channels in the white space for transmitting data. The request may be transmitted with a power that is based at least in part on the transmit power information received in the wireless communication.

Another aspect of the disclosure provides a computer readable medium comprising instructions that when executed cause an apparatus to receive a wireless communication in a channel of a white space. The wireless communication may authorize an initial transmission and identify transmit power information for communicating in the white space. When executed, the instructions may further cause the apparatus to wirelessly transmit a request for information identifying one or more channels in the white space for transmitting data. The request may be transmitted with a power that is based at least in part on the transmit power information received in the wireless communication.

Another aspect of the disclosure provides an apparatus for wireless communication. The apparatus comprises a processor configured to determine transmit power information for another apparatus to communicate in a white space, and a transmitter configured to transmit a wireless communication in a channel of the white space. The wireless communication may authorize an initial transmission by the other apparatus and identify the transmit power information.

Another aspect of the disclosure provides a method of wireless communication. The method comprises determining transmit power information for another apparatus to communicate in a white space, and transmitting a wireless communication in a channel of the white space. The wireless communication may authorize an initial transmission by the other apparatus and identify the transmit power information.

Another aspect of the disclosure provides an apparatus for wireless communication. The apparatus comprises means for determining transmit power information for another apparatus to communicate in a white space, and means for transmitting a wireless communication in a channel of the white space. The wireless communication may authorize an initial transmission by the other apparatus and identify the transmit power information.

Another aspect of the disclosure provides a computer readable medium comprising instructions that when executed cause an apparatus to determine transmit power information for another apparatus to communicate in a white space, and transmit a wireless communication in a channel of the white space. The wireless communication may authorize an initial transmission by the other apparatus and identify the transmit power information.

BRIEF DESCRIPTION OF THE DRAWINGS

FIG. 4 is a representation of an aspect of the database of FIG. 3.

FIG. 5 is a representation of a communication for use in the wireless communication system of FIG. 1.

FIG. 6A is a representation of a portion of the communication of FIG. 5.

FIG. 6B is a representation of a portion of the communication of FIG. 5.

FIG. 6C is a representation of a portion of the communication of FIG. 5.

FIG. 6D is a representation of a portion of the communication of FIG. 5.

Figure 1:
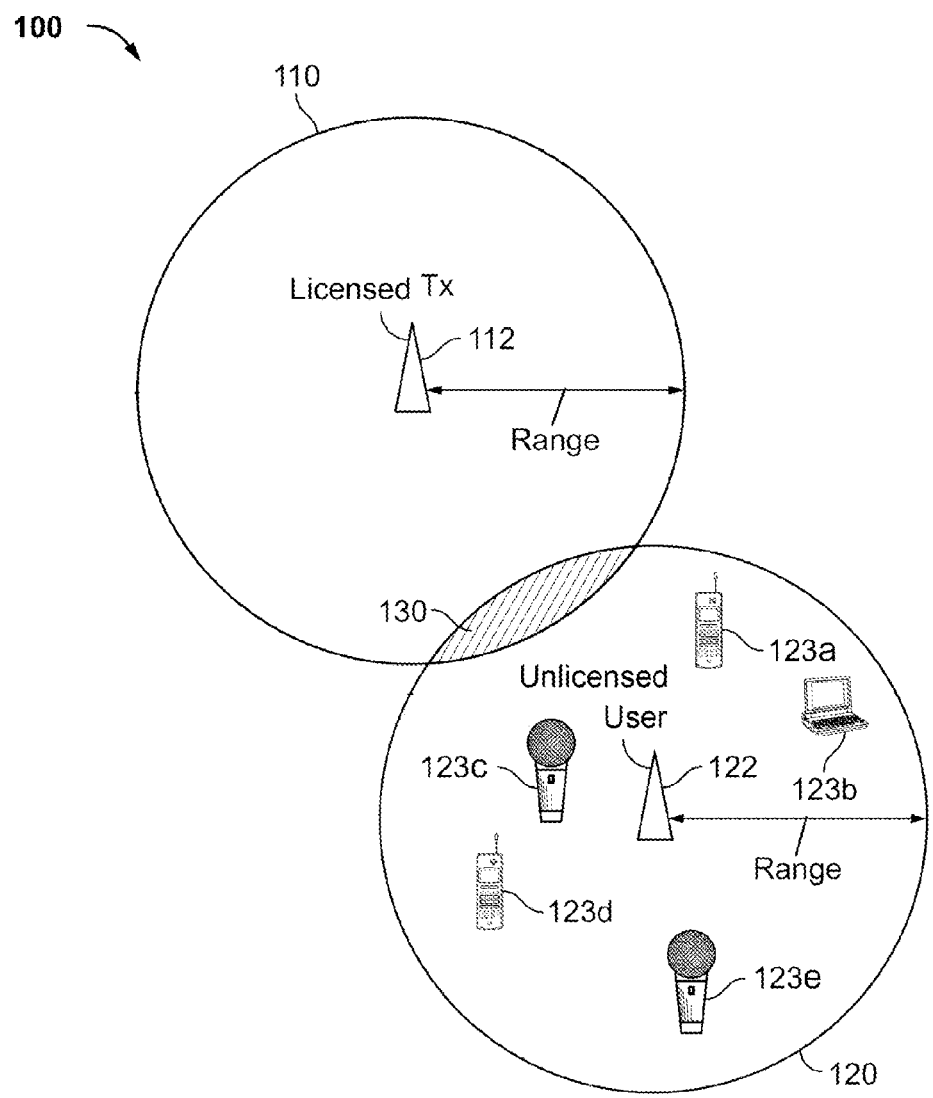
FIG. 1 is a simplified block diagram of several sample aspects of a portion of a wireless communication system.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method, or device. Similarly, some of the drawings may depict more components than a given system, method, or device actually implements. Further, like reference numerals may be used to denote like features throughout the specification and figures.

DETAILED DESCRIPTION

Various aspects of the novel systems, apparatuses, and methods are described more fully hereinafter with reference to the accompanying drawings. The teachings disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of or combined with any other aspect of the invention. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), cdma2000, etc. UTRA includes Wideband-CDMA (W-CDMA) and Low Chip Rate (LCR). cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, IEEE 802.22, Flash-OFDMA, etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS and LTE are described in documents from an organization named "3rd Generation Partnership Project" (3GPP). Similarly, cdma2000 is described in documents from an organization named "3rd Generation Partnership Project 2" (3 GPP2).

The aspects described herein may be used in conjunction with a white space comprising frequencies that are defined for licensing to television (TV) broadcasters. Such white space may be referred to as TV white space (TVWS). In some aspects, aspects of the devices and methods described herein may implement a standard such as 802.11af, for example using OFDM. In some aspects, the devices and methods described herein may implement a standard such as 802.11z or one of the 802.22 standards. By way of example only, the devices and methods herein will be described consistent with the 802.11af standard and a TVWS. Those having ordinary skill in the art will appreciate, however, that the systems, methods, and devices described herein may be used in conjunction with standards other than 802.11af and with a white space other than a TVWS.

In some aspects the teachings herein may be employed in a network that includes macro scale coverage (e.g., a large area cellular network such as a 3G network, typically referred to as a macro cell network, or a broadcast network such as may be used by television broadcasters) and smaller scale coverage (e.g., a residence-based or building-based network environment). As an access terminal (AT) or user equipment (UE) moves through such a network, the access terminal may be served in certain locations by access nodes (ANs) that provide macro coverage while the access terminal may be served at other locations by access nodes that provide smaller scale coverage. In some aspects, the smaller coverage nodes may be used to provide incremental capacity growth, in-building coverage, and different services (e.g., for a more robust user experience). In the discussion herein, a node that provides coverage over a relatively large area may be referred to as a macro node. A node that provides coverage over a relatively small area (e.g., a residence) may be referred to as a femto node. A node that provides coverage over an area that is smaller than a macro area and larger than a femto area may be referred to as a pico node (e.g., providing coverage within a commercial building).

In some aspects, an access node may comprise an access point ("AP") and/or a client (also referred to as a station or "STA"). In general, an AP serves as a hub or base station for a network and an STA serves as a user of the network. For example, an STA may be a laptop computer, a personal digital assistant (PDA), a mobile phone, etc. In an example, an STA connects to an AP via a WiFi (e.g., IEEE 802.11 protocol) compliant wireless link to obtain general connectivity to the Internet or to other wide area networks. In some implementations an STA may also be used as an AP. In some aspects, a WiFi protocol that accesses or utilizes a white space such as a TVWS may be referred to as a White-Fi protocol.

A station "STA" may also comprise, be implemented as, or known as an access terminal ("AT" as discussed above), a subscriber station, a subscriber unit, a mobile station, a remote station, a remote terminal, a user terminal, a user agent, a user device, user equipment, or some other terminology. In some implementations an access terminal may comprise a cellular telephone, a cordless telephone, a Session Initiation Protocol ("SIP") phone, a wireless local loop ("WLL") station, a personal digital assistant ("PDA"), a handheld device having wireless connection capability, or some other suitable processing device connected to a wireless modem. Accordingly, one or more aspects taught herein may be incorporated into a phone (e.g., a cellular phone or smartphone), a computer (e.g., a laptop), a portable communication device, a headset, a portable computing device (e.g., a personal data assistant), an entertainment device (e.g., a music or video device, or a satellite radio), a gaming device or system, a global positioning system device, or any other suitable device that is configured to communicate via a wireless medium.

An access point ("AP") may also comprise, be implemented as, or known as a NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, or some other terminology.

A cell associated with a macro node, a femto node, or a pico node may be referred to as a macro cell, a femto cell, or a pico cell, respectively. In some implementations, each cell may be further associated with (e.g., divided into) one or more sectors.

In various applications, other terminology may be used to reference a macro node, a femto node, or a pico node. For example, a macro node may be configured or referred to as an access node, base station, access point, eNodeB, macro cell, and so on. Also, a femto node may be configured or referred to as a Home NodeB (HNB), Home eNodeB (HeNB), access point base station, femto cell, and so on.

As discussed above, the white space in a system may be under-utilized. Under-utilized portions of frequency spectrum may also sometimes be referred to as spectral holes.

Spectrum sharing allows unlicensed users access to licensed portions of frequency spectrum when there is no licensed transmitter or user for a respective licensed frequency band at a given time and/or in a particular geographic location. In some aspects, an unlicensed user may be able to lookup or otherwise detect times when a specific licensed band is unused in a particular area and then use the band for communication without causing significant interference to transmissions of a license-holder.

Figure 2:
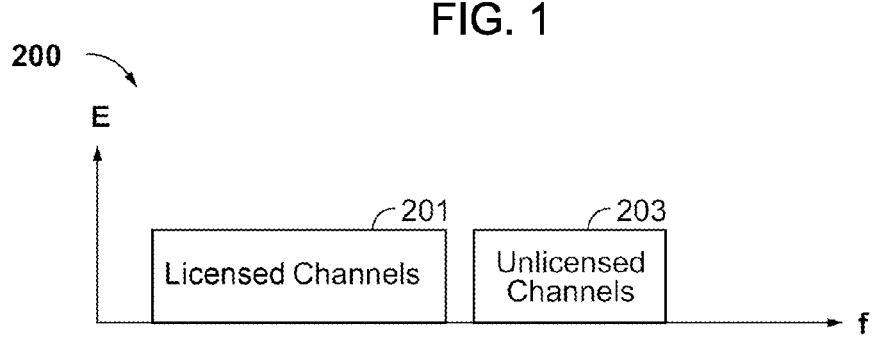
FIG. 2 is a simplified frequency diagram of example channels in the wireless communication system of FIG. 1.

FIG. 1 is a simplified block diagram of several sample aspects of a portion of a wireless communication system 100. FIG. 2 is a simplified frequency diagram of example channels in a portion of spectrum 200 that may be licensed for use in the wireless communication system 100 of FIG. 1A. For example, the channels in spectrum 200 may comprise TV channels that may be licensed by the Federal Communications Commission (FCC) for stations to broadcast television content in the United States. In other countries, TV channels may be licensed by another body or agency.

The portion of spectrum 200 includes a frequency band of licensed channels 201 and a frequency band of unlicensed channels 203. The unlicensed channels 203 may therefore comprise a white space, for example a TVWS. The channels 203 may not have been licensed for any number of reasons. For example, there may not be as many users that desire a license as there are licenses to assign. In some aspects, certain of the channels 203 may be unlicensed because they are less desirable, for example because of heavy congestion, the presence of unregulated transmitters, and/or natural propagation characteristics of the unlicensed band of spectrum.

With further reference to FIG. 1A, the system 100 includes a licensed transmitter 112 and an unlicensed user 122. In the illustrated aspect, five user nodes 123a, 123b, 123c, 123d, and 123e are located within range of the unlicensed user 122. In some aspects, one or more of the nodes 123a, 123b, 123c, 123d, and 123e are also unlicensed. Those skilled in the art will appreciate that any number of nodes may be within range of the licensed transmitter 112 and/or the unlicensed user 122. An area 130 represents a geographic area where an area 110 within range of the licensed transmitter 112 and an area 120 within range of the unlicensed user 122 overlap.

If a frequency band is under-utilized in the area 130, the unlicensed user 122 may in some aspects extend transmissions into the area 130 to take advantage of a spectral hole in the primary channels 201. This process may be subject to certain regulatory schemes, for example as described in additional detail below. Those having ordinary skill in the art will appreciate, however, that the various aspects described herein are not limited to operations according to any single scheme, and may incorporate an extension of transmission into the area 130 using any number of means or schemes.

As discussed above, one example of an under-utilized frequency spectrum may include a TV frequency band. The TV frequency band may display excellent signal to noise characteristics in certain aspects, for example when occupying a frequency space above 100 Mhz. Thus, the unlicensed channels 203 may comprise television channels that have not been licensed to a broadcaster, and are referred to herein as TVWS. For example, the transition from analog broadcast of television programming to digital broadcast freed previously used spectrum which may now comprise TVWS.

Before a device transmits in a TVWS, the device may check that a TV channel is empty from licensed transmitters and/or other primary users. In certain aspects, primary are the users who have higher priority or legacy rights on the usage of a specific part of the TV spectrum. For example, wireless microphone systems may be considered as primary users in certain aspects of the wireless communications system 100. In FIG. 1, the user nodes 123c and 123e are illustrated as wireless microphone systems.

In some aspects, a device that desires to transmit in the TVWS may infer the presence or absence of the TV primary users through communication with a database having registered primary user information, and/or through spectrum sensing in certain aspects. Certain regulatory schemes contemplate a database populated by all primary users of a particular frequency band at a given geo-location, for example as may be managed by the FCC or other body or agency.

In some aspects, a device that desires to communicate in the TVWS may be configured to determine its geo-location within a certain accuracy, for example fifty meters, to determine whether a TV channel is empty from TV primary users registered in the database. Some devices that desire to communicate in the TCWS, however, may not be able or may select not to determine such an accurate geo-location. For example, a device may not be equipped with such geo-location determination capability, or may be in a location that does not allow for the determination of the geo-location to the degree of accuracy.

Figure 3:
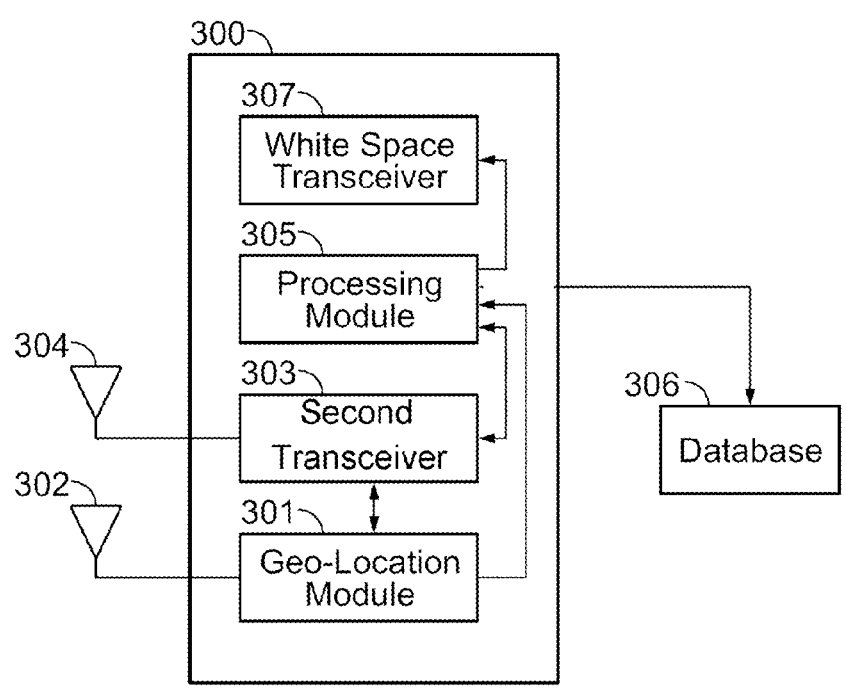
FIG. 3 is a functional block diagram of an aspect of a device that may be employed within the wireless communication system of FIG. 1, which device is in communication with a database.

FIG. 3 is a functional block diagram of an aspect of a wireless communication device 300 that may be employed within the wireless communication system of FIG. 1. For example, the device 300 may comprise the unlicensed user 122 illustrated in FIG. 1.

The device 300 may include a geo-location module 301, a geo-location antenna 302, a processing module 305, a white space transceiver 307, a second transceiver 303, and/or a second antenna 304. In some aspects, the geo-location module 301 and the second transceiver 303 may both use a common antenna instead of two separate antennas, as illustrated in FIG. 3. In some aspects, the second antenna 304 may be omitted, for example when the second transceiver 303 is configured to send and receive information over a wired connection.

The geo-location module 301 may be capable of determining a geographic or geo-location of the device 300, for example through signals transmitted and received by the geo-location antenna 302. The geo-location module 301 may be capable of determining the geo-location with a great degree of accuracy by employing a Global Positioning System (GPS) or the like. The geo-location module 301 may also or instead be capable of determining a geo-location with a lesser degree of accuracy, for example using terrestrial triangulation or the like. For example, the geo-location module 301 may comprise a GPS receiver, a GPS receiver assisted with WAN localization, components for sensing for nearby WLAN access points and inferring location based on the WLAN access points, or any other elements or devices that implement localization technology. The geo-location module 301 may be capable of performing an accurate geo-location determination in certain environments, and a less accurate geo-location in other environments. For example, the geo-location module 301 may be capable of determining an accurate geo-location while signal reception and/or network strength is high, and may be capable of determining a less accurate geo-location when signal reception and/or network strength is low, such as when the device 300 is located inside a building or other structure.

The white space transceiver 307 may be capable of sending and receiving wireless communications over one or more channels in a white space, for example a TVWS. Although the module 307 is illustrated as a transceiver in FIG. 3, a white space receiver and a separate white space transmitter may be implemented in addition or instead. Further, the white space transceiver 307 may be coupled to an antenna (not shown) for receiving the wireless communications. The antenna may be separate from the antennas 302 and 304, or the white space transceiver 307 may share one or both of the antennas 302, 304.

The processing module 305 may be configured to receive a geo-location determined by the geo-location module 301. In some aspects, the processing module 305 may be capable of determining an accuracy of the geo-location based on the capabilities of the device 300 and the information received from the geo-location module 301. The processing module 305 may use the received geo-location to query a database 306, for example using the second transceiver 303, to receive available communication channels or available frequency bands in the TVWS for communication.

The second transceiver 303 may be configured to communicate with the database 306. In some aspects, the second transceiver 306 is configured to send and receive communications over a channel that is outside of the TVWS. For example, the second transceiver 303 may comprise a non-white space transceiver for communicating with the database 306 when implementing the 802.11af standard. In some aspects, the second transceiver 303 may establish a wired connection with the database 306. In some aspects, the second transceiver 303 may communicate with the database 306 over a cellular channel that is outside of the white space. In one aspect, the second transceiver 306 exchanges data with the database 306 using an Internet Protocol (IP). Although the module 303 is illustrated as a transceiver in FIG. 3, a receiver and a separate transmitter may be implemented in addition or instead. Further, the white space transceiver 307 and the second transceiver 303 may be implemented separate, as illustrated in FIG. 3, or may be implemented in a common transceiver. In some aspects, the white space transceiver 307 and the second transceiver 303 are implemented separately, but share one or more components.

FIG. 4 is a representation of an aspect of the database 306 illustrated in FIG. 3. The database 306 may include information regarding frequencies or communication channels in a licensed frequency band or spectrum. For example, the database 306 may include information about a TV frequency band. In some aspects, the database 306 may comprise user information identifying users transmitting in the frequency bands. The user information may include information, for example, regarding one or more licensed or primary users of a particular frequency band. The user information may include one or more of a signal strength, primary user geo-location, a frequency associated with a user, or a particular frequency band or channel for user communication. In some aspects, the user information relates to devices that have registered, been authorized, or been enabled for transmitting in a channel in white space. In some aspects, the user information may include information identifying one or more devices that are not allowed to transmit in the system 100 or in particular channels of the system 100 or in particular channels of the white space. The system 100 may include any number users over a given channel in some aspects. Additionally and/or alternatively, a hierarchy of priority among the users can be applied such that a user having a higher priority to a channel is not interfered with by a user having a lower priority over the channel.

In some aspects, the database 306 includes power information for one or more of the channels. The power information may apply to all channels, or may apply to certain ones of the channels. In the illustrated aspect, each channel in a location is associated with power information in the database 306. The power information identifies a power for transmitting over the channel that it is associated with. The power information may include an optimal power, for example that reduces a signal to noise ratio (SNR) or interference, or may comprise a maximum power that devices at that location are allowed to transmit with. In some aspects, different power information is defined for a number of different types or classes of devices at each location and/or in each channel of each location. For example, the database 306 may include different maximum powers for fixed nodes and for portable nodes. In some aspects, there may be a plurality of different types of power information for each device in a class. In some aspects, there may be a plurality of different types of power information for a class of devices. For example, there may be information for portable devices operating in a high power mode, as well as power information for portable devices operating in a low power mode.

Any number of locations may be included in the database 306, and any number of frequencies or channels may be included for each of the locations. In one aspect, the database 306 comprises a remote or centralized database that may be accessed by any device that desires to communicate in TVWS. For example, in certain implementations of the 802.11af standard, the database 306 may be maintained by the FCC. In combination with the processes described below, the FCC may administer the database 306 so as to regulate devices that transmit in the TVWS at each of the locations, and to regulate which channels of the TVWS those devices transmit over. Further, the FCC may regulate the power that any given device may use by providing the power information discussed above.

The database 306 may reside in an access node or any communication device in the communication network 100. For example, the database 306 may comprise a server that the device 300 may communicate with through a network or internet connection. Those skilled in the art will appreciate that the database is not limited to or required to have any particular number of geo-locations, frequency bands, communication channels, or types of power information.

Returning now to the description of FIG. 3, the processing module 305 may query the database 306, for example using the second transceiver 303 as described above, in order to receive information for at least one of the geo-locations in the database 306. For example, the processing module 305 may use the second transceiver 303 to send the geo-location received from the geo-location module 301 to the database 306. The geo-location may be included in or comprise a request for permission to transmit data in the TVWS. The database 306 may receive the requests or queries from the device 300 and respond by transmitting information regarding available TVWS channels.

The device 300 may therefore transmit the geo-location information from the geo-location module 301 to the database 306, and request information regarding available frequencies or available communication channels in the TVWS based on the geo-location information. In some aspects, the device 300 may also transmit information identifying itself to the database 300, for example a regulatory identification of the device 300 such as may be included in a Device Identification Info field. If the database 306 determines that the device 300 is allowed to communicate in the TVWS and that one or more channels are available, the database 306 may transfer information regarding available frequencies or available communication channels to the device 300 based on the geo-location information. Transmitting this information to the device 300 may authorize or enable the device 300 to communicate data over those channels in the TVWS. The database 306 may include the power information when transmitting the available channels. For example, a power management element transmitted to the device 300 for determining transmission power in the TVWS may comprise the power information or information derived therefrom.

For example, the processing module 305 may query the database 306 with a geo-location corresponding to Location A. In response, the database 306 may transmit all information regarding any of the Frequency Bands 1-N in the TVWS corresponding to Location A that are available and that the device 300 is authorized to transmit over. In some aspects, the power information corresponding to those frequency bands are also transmitted. For example, a power for transmitting over all of the channels, or for transmitting over certain ones of the channels may be transmitted. In some aspects, power information that all devices may utilize is transmitted. In other aspects, power information specific to a type of the device 300 is transmitted. In still other aspects, power information for all types of devices and modes of the devices that are authorized to communicate in each of the frequency bands is transmitted.

In some aspects, the device 300 further includes a memory (not shown). For example, the memory may be implemented in the processing module 305 or separately from the processing module 305. The memory may be configured to store the channels over which the device 300 is authorized to transmit. In some aspects, the device 300 is only configured to transmit over certain channels in the TVWS, but the memory stores information regarding all channels in the TVWS that are available for transmission by 802.11 or other whitespace devices, regardless of whether the device 300 is configured to transmit over all the channels. Further, the memory may be configured to store power information for one or more of the channels are stored in the memory.

In some aspects, the processing module 305 may also or instead query the database 306 for a particular frequency band in the TVWS corresponding to a particular geo-location. In response, the database 306 may transmit only whether the device 300 is allowed to transmit in that frequency band, or may respond by transmitting a power that the device 300 may use for communicating in the frequency band. For example, the processing module 305 may query the database 306 for information regarding a geo-location corresponding to Location B and for a frequency corresponding to Frequency Band 2. As a result, the database 306 may transmit the power information corresponding to the Frequency Band 2 in the Location B.

The processing module 305 may be configured to communicate with the white space transceiver 307 regarding the available frequencies or available communication channels in the TVWS received from the database 306. Reception of the frequencies or channels may grant the device 300 permission to communicate over these frequencies or channels. Thus, the device 300 is authorized or enabled by the database 306, and the white space transceiver 307 may be tuned to communicate over the frequencies or communication channels received from the database 306. Transmissions over these frequencies or communications channels in the TVWS may be performed pursuant to power information received from the database 306.

The device 300 may be configured to communicate with any number of devices in the communication system 100 over one or more channels in the TVWS. For example, when the device 300 comprises an AP, the device 300 may be used to communication with one or more STAs. Similarly, the device 300 may comprise an STA or UE, and may communicate with other STAs or with an AP.

In some aspects, the white space transceiver 307 is configured to transmit a wireless communication in the TVWS that authorizes an initial communication by a device receiving the wireless communication. The initial communication may be used by the receiving device to attempt to receive enablement, for example as described in additional detail below.

FIG. 5 is a representation of a wireless communication 500 that the device 300 may use to authorize an initial transmission. In FIG. 5, the communication 500 is illustrated as a beacon that is broadcasted by the white space transceiver 307. The beacon may be used by devices that are in the area 120 to determine that an initial transmission is authorized, and to determine a power at which to transmit that initial transmission.

The beacon 500 may include an FC field 502, a destination address field 504, and one or more information elements (IEs) 506. In some aspects, the beacon 500 may also include one or more other fields, for example as shown in FIG. 5. The FC field may comprise a frame control, for example that identifies the communication 500 as a beacon. The destination address field 504 may include a broadcast address, for example that indicates to any device receiving the communication 500 that the communication 500 is being broadcasted.

At least one of the IEs 506 may include information that indicates that the beacon 500 is authorizing an initial transmission. In various embodiments, the IEs 506 can include country information and/or an operating class. The operating class can be an index into a set of values for radio operation in a regulatory domain. The operating class tables can also contain pointers to behaviors and signal detection limits. For example, the operating class can identify an authorized transmit power for an initial transmission, via an index into a table of authorized transmit powers. A device receiving an authorization for initial transmission including an operating class can use the operating class as an index into the table of authorized transmit powers in order to determine an authorized initial transmit power. In other embodiments, the IEs 506 can include other information, as described below with respect to FIG. 6A.

FIG. 6A is a representation of an aspect 506a of an IE of the communication 500. The IE 506a may include an element ID 602. The element ID may comprise an identifier that signals to devices receiving the IE 506a that enablement is possible, for example by authorizing the receiving devices to transmit an initial communication. In some aspects, the element ID 602 comprises a Geodatabase Inband Enabling Signal. In such aspect, the device 300 that transmits the Geodatabase Inband Enabling Signal may be referred to as an enabling device.

The IE 506a may further include a length field 604. The length field 604 may indicate a length of the IE 506a, or may merely indicate a length of the remaining portion of the IE 506a. A device receiving the IE 506a may use the length field 604 to determine where the IE 506a ends and where the next IE 506 in the beacon 500 begins.

The IE 506a may further include power information 606. The power information 606 may be determined by the processing module 305, for example based on power information or a power element received from the database 306. The power information may indicate a power at which devices receiving the IE 506a may transmit the initial communication. For example, in the aspect illustrated in FIG. 6A, the power information 606 comprises a maximum transmit power.

The maximum transmit power may indicate to any device receiving the IE 506a that the initial communication may be transmitted with a power equal to or less than the maximum transmit power. Those having ordinary skill in the art will appreciate that the power information 606 is not required to include a maximum transmit power. The power information 606 may include any information that may be used by a receiving device to determine the power of the initial communication. In some aspects, the power information 606 may include a target power at which the device 300 desires to receive the initial communication. The power information 606 may then be used in conjunction with a sensed SNR or interference rate to determine a power for transmitting the initial transmission. In some aspects, the power information instead or in addition includes a minimum transmission power, for example as determined by the processing module 305 based on a received power element and network congestion conditions.

In some aspects, the power information 606 may be determined by the processing module 305 based on a power used to transmit the beacon 500. For example, the processing module 305 may set the power information to indicate a power that is equivalent to the maximum power that the device 300 has been authorized to use when transmitting in the white space. This power may have been determined by the processing module 305, for example, based on a type of the device 300 (such as fixed or portable, for example), an operating mode of the device 300 (such as high power or low power, for example), and/or a channel in the TVWS over which the device 300 is broadcasting the beacon 500.

In some aspects, the processing module 305 is configured to identify a plurality of powers that may be used to transmit the initial communication, and to select one of them for inclusion in the power information 606. For example, when the processing module 305 has stored power information from the database 306 relating to a plurality of device types, operating modes, and/or a channel in the TVWS, the processing system 305 may select a minimum value from this stored information and include that value in the power information 606. Those having ordinary skill in the art will appreciate other methods that may be used to select information included in the power information 606.

In some aspects, the power information 606 may be used by a device receiving the beacon 500 to determine a power for transmitting in the same channel over which the beacon 500 is received. In such aspects, the white space transceiver 307, for example, may receive an initial communication from a device over the same channel that the white space transceiver 307 broadcasted the beacon 500.

FIG. 6B is a representation of an aspect 506b of an IE of the communication 500. The IE 506b includes the ID 602 and the length field 604. Further, the IE 506b may include power information 616 for each of a plurality of device types. For example, in the illustrated aspect, the IE 506b includes a plurality of fields 614 that each identify a device type. Following each field 614 identifying a device type is power information 616 for that device type. In the illustrated aspect, the power information 616 indicates a maximum power at which a respective device type may transmit in the TVWS. In some aspects, the IE 506b authorized devices receiving the IE 506b to transmit an initial communication over the same channel that the IE 506b is broadcast. The power information 616 may be determined or selected by the processing module 305 based on stored information or information received from the database 306 using any number of methods.

FIG. 6C is a representation of an aspect 506c of an IE of the communication 500. The IE 506c includes the ID 602 and the length field 604. Further, the IE 506c includes power information 626 for each of a plurality of channels in the TVWS. For example, in the illustrated aspect, the IE 506c includes a plurality of fields 622 that each identify a channel. Following each field 622 identifying a channel is power information 626 for that channel. In the illustrated aspect, the power information 626 indicates a maximum power at which a device receiving the beacon 500 may transmit an initial communication in a respective channel. In this aspect, the device 300 may receive the initial communication over any one of the channels indicated in the fields 622, for example using the white space transceiver 307. The power information 626 may be determined or selected by the processing module 305 based on stored information and/or information received from the database 306 using any number of methods.

FIG. 6D is a representation of an aspect 506d of an IE of the communication 500. The IE 506d includes the ID 602 and the length field 604. Further, the IE 506d includes power information 636 for one or more device types in each of a plurality of channels in the TVWS. For example, in the illustrated aspect, the IE 506d includes a plurality of fields 632 that each identify a channel. Following each field 632 identifying a channel is one or more fields 634 identifying one or more device types, respectively, that may transmit in that channel. In the illustrated aspects, the power information 636 follows each field 634 and indicates a maximum power at which the type of device identified in the preceding field 634 may transmit in the channel identified in the preceding field 632. In this aspect, the device 300 may receive the initial communication over any one of the channels indicated in the fields 622, for example using the white space transceiver 307. The power information 636 may be determined or selected by the processing module 305 based on stored information and/or information received from the database 306 using any number of methods.

As discussed above, the device 300 may receive an initial communication from one or more devices in response to the transmitted beacon 500. A response may include an ID of the device from which the response was transmitted, for example a regulatory identification. The processing module 305 may use information in the response to query the database 306 to determine whether the device that transmitted the response is authorized or enabled to transmit data in the TVWS. The response may comprise a request for a list of available channels in the TVWS.

In some aspects, the device 300 may estimate a geo-location of a device from which a response was received. The device 300 may determine that the device that transmitted the response is within range of the device 300. For example, the response may be received from the device 123a, 123b, or 123d illustrated in FIG. 1. The processing module 305 may therefore determine that the device that transmitted the response is near to the device 300, and may use include information based on a geo-location received from the geo-location module 301 when querying the database 306.

If the device that transmitted the response is authorized to communicate in the TVWS, the database 306 may return a list of available or permitted transmission channels to the device 300. The device 300 may then forward the list of channels to the device that transmitted the response to enable the device that transmitted the response to transmit data communications. If the device that transmitted the response is not authorized to communicate in the TVWS, the device 300 may instruct the device that transmitted the response to stop any further transmissions.

FIGS. 3 and 4 illustrate aspects of the device 300 and the database 306. Modules 301-305 and 307, however, may reside outside of the device 300, or may be implemented as a greater or fewer number of modules. Similarly, the information and fields illustrated with respect to the database 306 may be distributed or stored in a single device, and less or more information may be stored in the database 306 than was described above.

Figure 7:
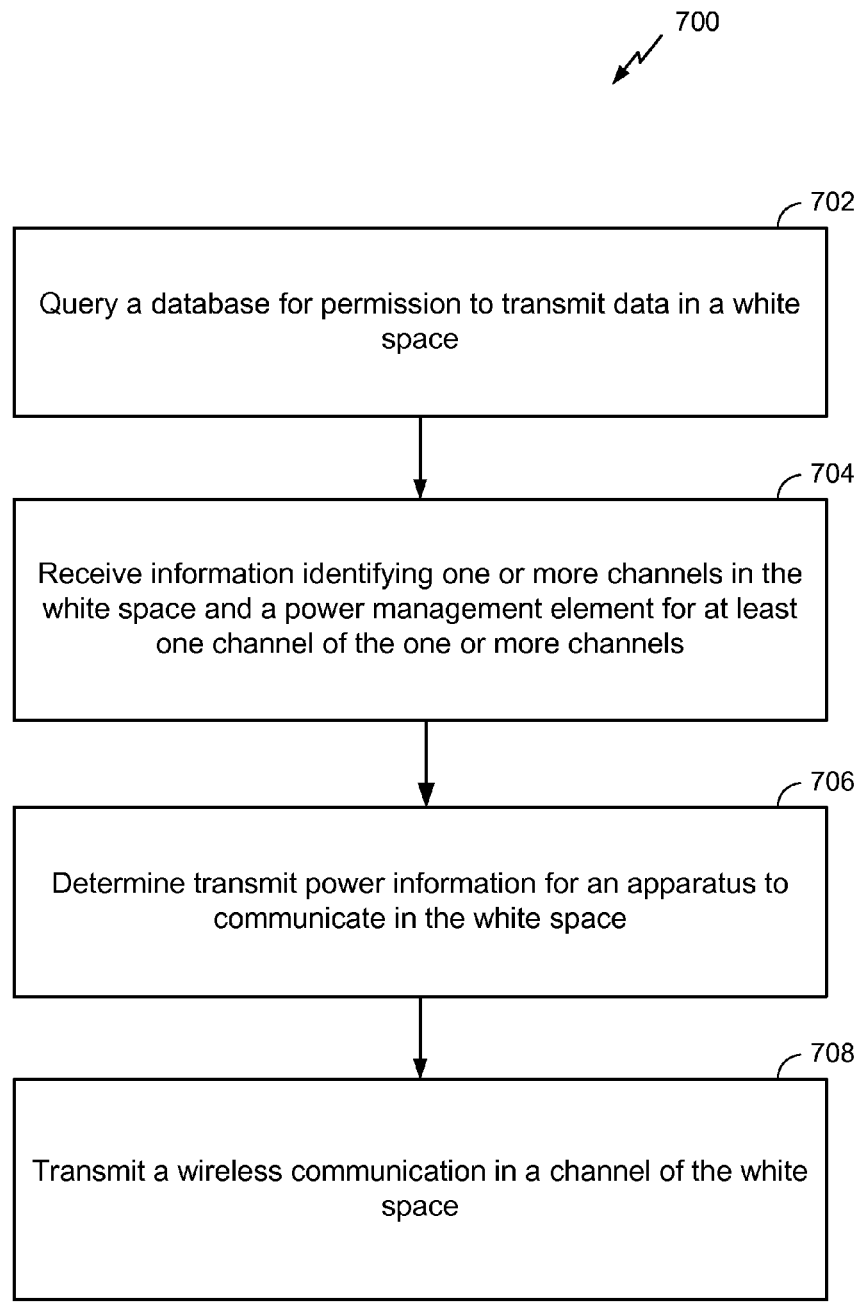
FIG. 7 is a flowchart of an aspect of a method for transmitting a wireless communication.

FIG. 7 is a flowchart of an aspect 700 of a method for transmitting a wireless communication. The method 700 may be used to enable a device for transmitting data in a white space and/to or transmit a communication authorizing an initial transmission in the white space, for example in the wireless communication system 100 described above. The method may be performed by an unlicensed node, for example the device 300. Although the method 700 is described below with respect to elements of the device 300, those having ordinary skill in the art will appreciate that other components may be used to implement one or more of the steps described herein.

At block 702, a database is queried for permission to transmit data in a white space. The white space may be a TVWS, for example, and the database may comprise a database maintained by an entity or agency such as the FCC for regulating transmissions in the white space, as an example. In one aspect, the database comprises the database 306 described above. The query may be transmitted by the second transmitter 303, for example, over a wired or wireless channel outside of the white space. The query may include a geo-location and/or an identifier of the device 300.

Next, at block 704, information identifying one or more channels in the white space is received, as is a power management element for at least one channel of the one or more channels. The one or more channels may comprise channels over which the device 300 is permitted to transmit data, and/or channels over which other devices in the system 100 are permitted to transmit. The power management element may include power information for transmitting over the channels, and may pertain to one or a plurality of device types and/or operating modes. The information identifying one or more channels and the power management element may be received from the database 306 in response to the query at block 702.

Thereafter, at block 706, transmit power information for another apparatus to communicate in the white space is determined For example, the processing module 305 may determine a maximum power or other power information for other devices that desire to transmit in the white space based on the power element received at block 704. The power may be selected from a plurality of powers, and/or may be based on a transmit power being used by the device 300.

Subsequently, at block 708, a wireless communication is transmitted in a channel of the white space. The wireless communication may authorize an initial transmission by the other apparatus and may identify the determined transmit power information. The wireless communication may be transmitted by the white space transceiver 307, for example. The wireless communication may comprise the beacon 500 and/or the IE 506, described above with respect to FIGS. 5 and 6A-6D, to notify the other device that an initial transmission is permitted. The wireless communication may be broadcast to all devices that are within range of the device 300. Based on this communication, the wireless device 300 may aid one or more other devices that receive the wireless communication to boot strap an enablement procedure, for example by querying the database 306 with an identifier of the other device and a geo-location determined at the device 300.

Figure 8:
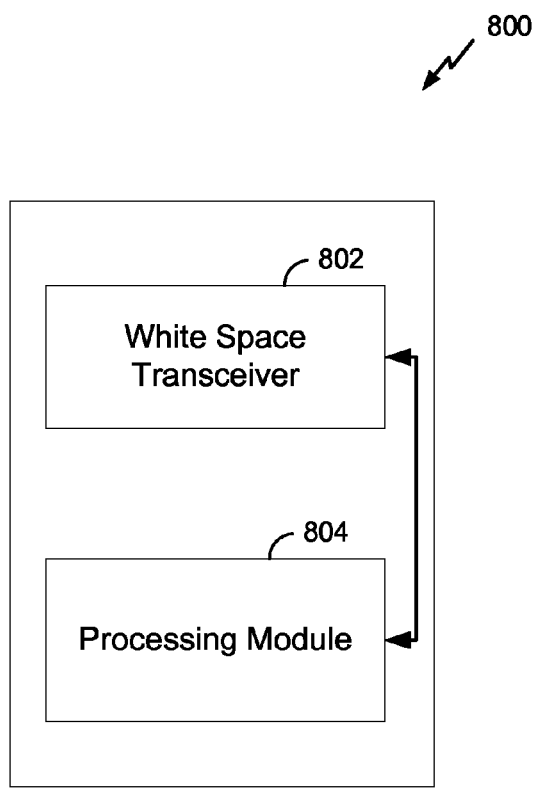
FIG. 8 is a functional block diagram of an aspect of a device that may be employed within the wireless communication system of FIG. 1.

FIG. 8 is a functional block diagram of an aspect of a wireless communication device 800 that may be employed within the wireless communication system of FIG. 1. For example, the device 800 may comprise one of the devices 123*a*, 123*b*, or 123*d* illustrated in FIG. 1.

The device 800 may include a white space transceiver 802 and a processing module 804. In some aspects, the white space transceiver 802 is configured similar to the white space transceiver 307 described above with respect to FIG. 3. For example, the white space transceiver may receive and transmit communications in a TVWS. A transmitter and a separate receiver may be implemented instead of a single transceiver 802, and an antenna may be coupled to the receiver or transmitter transceiver, as discussed above with respect to the white space transceiver 307. The white space transceiver 802 may be configured to receive wireless communications from the device 300 over the TVWS, and to transmit responses thereto over the TVWS.

As shown in FIG. 8, the device 800 may omit or disable the functionality of a second transceiver and/or a geo-location module. Thus, in some aspects, the device 800 may be unable or may have determined not to query the database 306 for enablement as discussed above with respect to the device 300. In order for the device 800 to become enabled, the device 800 may be configured to boot strap a process of enablement used by the device 300.

The device 800 may comprise an unlicensed device. Unlicensed devices are generally not permitted to transmit data in the TVWS until they have been enabled, for example by the FCC using the database 306. When the device 800 is unable or has determined not to query the database 306 directly for enablement, however, the device 800 may thus be stuck in a state in which it is not permitted to transmit over the TVWS.

Before being enabled, the device 800 may used the white space transceiver 802 to monitor one or more channels in the TVWS. When a wireless communication such as the beacon 500 is received, the processing system 804 may determine that the device 800 has been authorized to transmit an initial communication.

In response to the beacon or another such wireless communication authorizing an initial transmission, the device 800 may transmit a request for information identifying one or more channels in the TVWS that the device 800 may transmit data over. In some aspects, the request is transmit in the same channel over which the beacon was received.

As discussed above, the beacon may include power information. In such aspects, the processing module 804 may determine a power for transmitting the request based on the power information received in the beacon. For example, when the beacon comprises an IE configured as shown in FIG. 6A, the processing module 804 may determine a transmission power that is less than the maximum power indicated in the IE. The white space transceiver 802 may then be used transmit the request at a power that is based on the determination made by the processing module 804.

In some aspects, the processing module is configured to select from a plurality of powers and/or is configured to select a channel over which to transmit the request. For example, when the white space transceiver 802 receives a beacon comprising an IE configured as shown in FIG. 6B, the processing module 804 may determine an appropriate power for transmitting the request based at least in part on a type and/or operating mode of the device 800 and the power information included in the IE.

When the white space transceiver 802 receives a beacon comprising an IE configured as shown in FIG. 6C, the processing module 804 may determine a channel for transmitting the request, as well as a power for transmitting the request over that channel based at least in part on the power information included in the IE. For example, the channel may be selected based on capabilities of the device 800 or the white space transceiver 802, or based on network parameters such as sensed interference on one or more of the channels indicated in the IE. Further, the processing module 804 may be configured to select a channel for transmitting the request based on the power information included in the IE. For example, the processing module may be configured to determine which ones of the power information the device 800 may satisfy or meet, for example based on capabilities of the device 800, and to select a channel corresponding to power information that may be met by the device 800.

When the white space transceiver 802 receives a beacon comprising an IE configured as shown in FIG. 6D, the processing module 804 may determine a channel for transmitting the request, as well as a power for transmitting the request over that channel based at least in part on a type and/or operating mode of the device 800 and the power information included in the IE. For example, the channel may be selected as discussed above, or based on a type or operating mode of the device 800. For example, the channel may be selected based on which devices are approved to transmit in that channel. Similarly, a power for transmitting a request for information identifying one or more channel may be selected from the power information received in the IE, as discussed above.

The device 800 may transmit the request to the device which transmitted the beacon or other communication authorizing the device 800 to initially transmit, or the device 800 may broadcast the request or transmit the request to a different device known to the device 800. A device that receives the request from the device 800 may query the database 306, for example as discussed above, to determine if the device 800 is permitted to transmit data over a channel in the TVWS.

If the device 800 is permitted to transmit data in the TVWS, the device 800 may become enabled by receiving a list of available channels in the TVWS that the device 800 may transmit over, for example using the white space transmitter 802. The list of channels may include a power management element indicated a power or power information for the device 800 to use when transmitting over the channels in the list. For example, the power element may indicate a maximum power for transmitting over one or more of the channels.

FIG. 8 illustrates an aspect of the device 800. Modules 802 and 804, however, may reside outside of the device 800, or may be implemented as a greater or fewer number of modules. Similarly, the modules 802 and 804 may implement more or less functionality than described above.

Figure 9A:
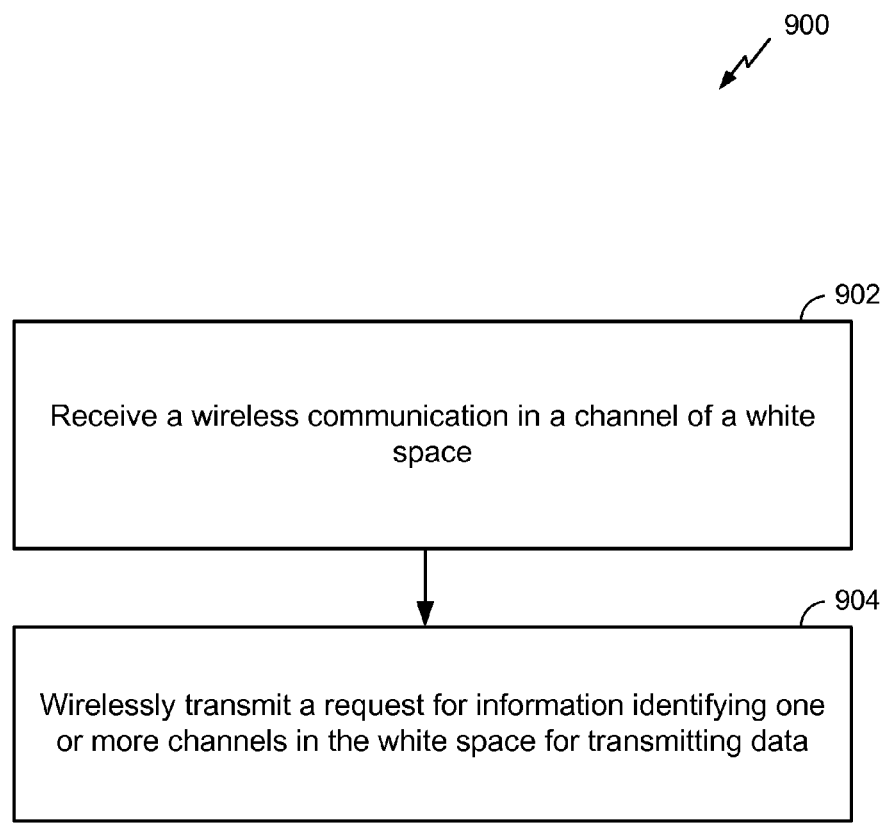
FIG. 9A is a flowchart of an aspect of a method for receiving a wireless communication.

FIG. 9A is a flowchart of an aspect 900 of a method for receiving a wireless communication. The method 900 may be used to boot strap an enablement procedure for transmitting data in a white space, for example in the wireless communication system 100 described above. The method may be performed by an unlicensed node, for example the device 800. Although the method 900 is described below with respect to elements of the device 800, those having ordinary skill in the art will appreciate that other components may be used to implement one or more of the steps described herein.

At block 902, a wireless communication is received in channel of a white space. The white space may be a TVWS, for example, and the wireless communication may be received using the white space transceiver 802. The wireless communication may authorize an initial transmission of the device 800 and may identify transmit power information for communicating in the white space. For example, the wireless communication may comprise the beacon 500 and/or the IE 506 described above with respect to FIGS. 5 and 6A-6D.

After the reception at block 902, a request for information identifying one or more channels in the white space for transmitting data may be wirelessly transmitted at block 904. The request may be transmitted, for example by the white space transceiver 802, at a power that is based on the power information received at block 902. The transmit power may be determined by the processing module 804, for example. The request may be transmitted in the same channel that the wireless communication was received over. In some aspects, the processing module 804 is configured to select a channel for transmitting the request based on information in the wireless communication received at block 902. For example, the wireless communication may include a plurality of fields that each identify a channel and/or a plurality of fields that each identify a type of device. The processing module 804 may determine a channel to transmit the request over, and may determine the transmit power based on a type of the device 800 and the channel.

In response to the request transmitted at block 904, the device 800 may receive a communication indicating that the device 800 is not permitted to transmit in the TVWS, may receive no communication, or may receive a list identifying channels over which the device 800 is permitted to transmit data. In this way, the device 800 may be enabled by a device transmitting the wireless communication, which may be the device 300 in certain aspects. The device 800 may further receive a power management element for determining transmit power when communicating in the white space.

Figure 9B:
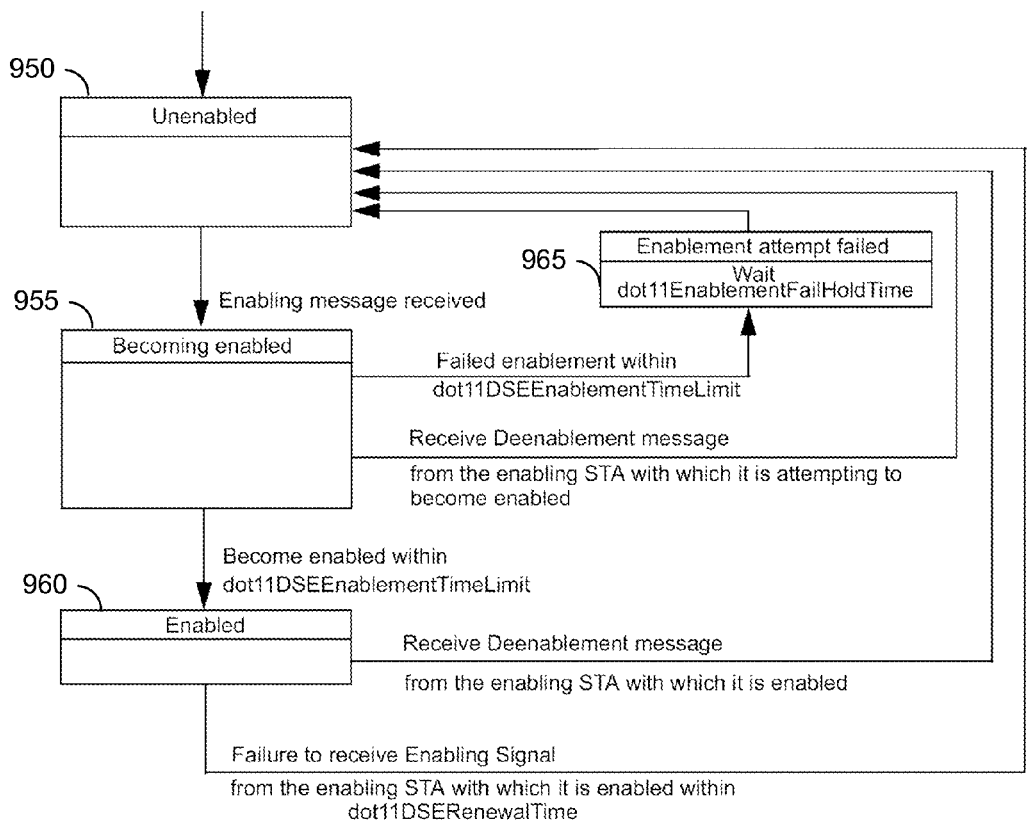
FIG. 9B is a block diagram showing a state machine for an aspect of a device that may be employed within the wireless communication system of FIG. 1.

For example, FIG. 9B is a block diagram showing a state machine for an aspect of the device 800, and shows different states that may be utilized during enablement of the device 800. When the device 800 is in the unenabled state 950, the white space transceiver 802 may listen to or monitor one or more channels of the white space. If the white space transceiver 802 receives a communication authorizing an initial transmission, as discussed above with respect to block 902, the device 800 may transmit a request for enablement, for example a request for information identifying one or more channel in the white space for transmitting data, discussed above with respect to block 904.

When an enabling message is received, the device 800 may enter a state of becoming enabled 955. The enabling message illustrated in FIG. 9B may be received from the device 300, for example, in response to the request transmitted from the device 800. The enabling message may be forwarded from or based on a communication from the database 306. Thus, the device 300 may comprise the enabling STA in FIG. 9B. Before the expiration of a certain time limit, the device 800 may enter the enabled state 960. In the enabled state 960, the device 800 may continue to transmit in the white space, for example by sending and/or receiving data communications. The state machine shown in FIG. 9B may be implemented by 802.11 devices, for example.

If, on the other hand, the device 800 fails to enter the enabled state 960 within the time limit, the device may enter a wait state 965 for a hold time, before entering the unenabled state 950. Similarly, if the device receives a deenablement message from the enabling STA with which it is attempting to become enabled, when the device 800 is in the becoming enabled state 955, the device 800 may enter the unenabled state 950.

FIGS. 10-13 illustrate aspects of systems and devices in which the teachings herein may be implemented. The systems and devices of FIGS. 10-13 are merely an example of a configuration in which white space communications and/or devices may be used. The aspects illustrated in FIGS. 10-13 do not limit the description above. Systems, devices, and methods described above may be implemented using elements or components other than those described below. Those of skill in the art will appreciate other configurations in which white space communications and/or devices may be used.

Figure 10:
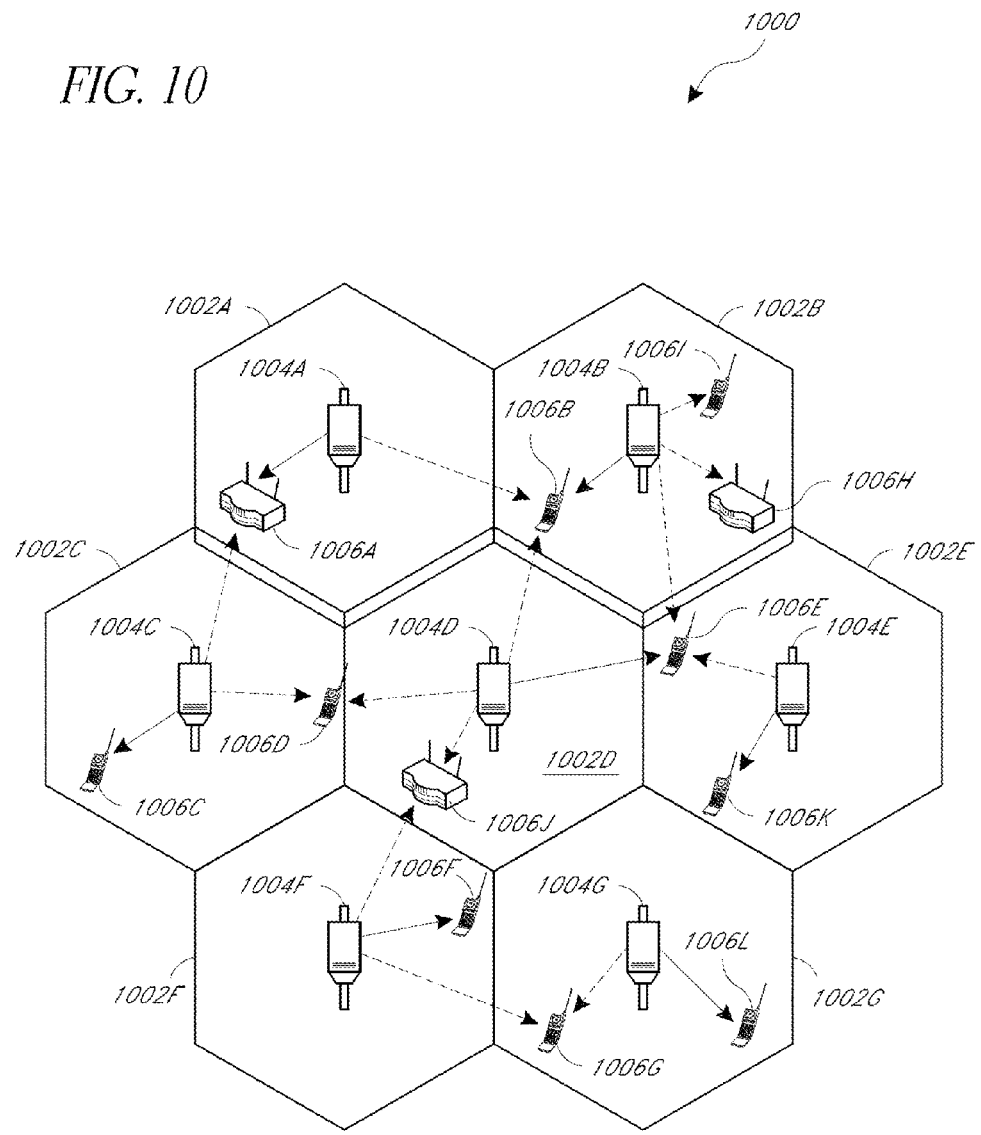
FIG. 10 is a simplified diagram of a wireless communication system.

FIG. 10 is a simplified diagram of a wireless communication system 1000, configured to support a number of users. The system 1000 provides communication for multiple cells 1002, such as, for example, macro cells 1002A-1002G, with each cell being serviced by a corresponding access point 1004 (e.g., access points 1004A-1004G). Access terminals 1006 (e.g., access terminals 1006A-1006L) may be dispersed at various locations throughout the system over time. Each access terminal 1006 may communicate with one or more access points 1004 on a forward link (FL) and/or a reverse link (RL) at a given moment, depending upon whether the access terminal 1006 is active and whether it is in soft handoff, for example. The wireless communication system 1000 may provide service over a large geographic region. For example, macro cells 1002A-1002G may cover a few blocks in a densely populated urban neighborhood or several miles in rural environment. One or more of the access points 1004 may comprise either of the devices 300 and 800. Similarly, one or more of the access terminals 1006 may comprise either of the devices 300 and 800.

Figure 11:
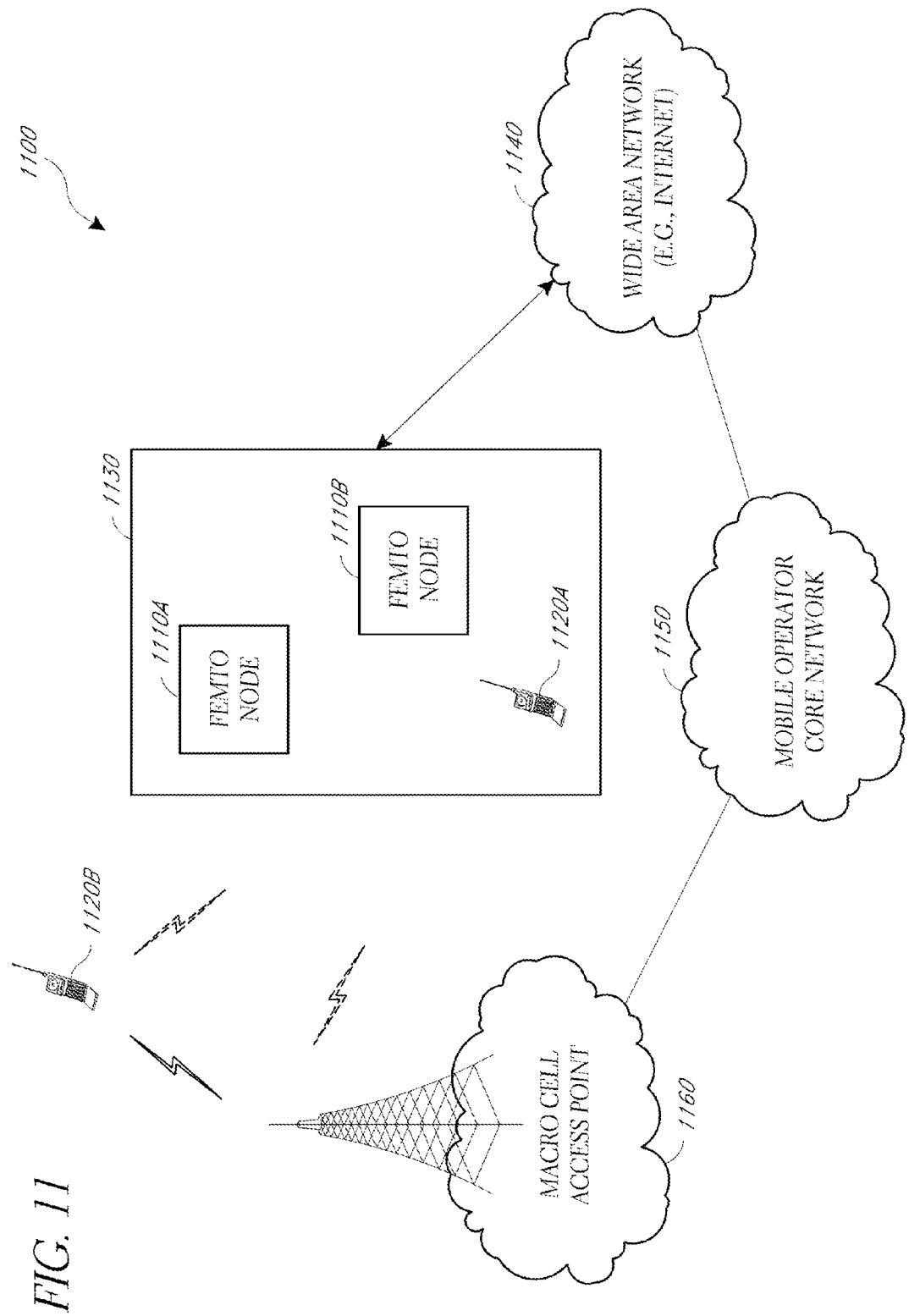
FIG. 11 is a simplified diagram of a wireless communication system including femto nodes.

FIG. 11 is a simplified diagram of an exemplary communication system 1100 where one or more femto nodes are deployed within a network environment. Specifically, the system 1100 includes multiple femto nodes 1110 (e.g., femto nodes 1110A and 1110B) installed in a relatively small scale network environment (e.g., in one or more user residences 1130). Each femto node 1110 may be coupled to a wide area network 1140 (e.g., the Internet) and a mobile operator core network 1150 via a DSL router, a cable modem, a wireless link, or other connectivity means (not shown). Each femto node 1110 may be configured to serve associated access terminals 1120 (e.g., access terminal 1120A) and, optionally, alien access terminals 1120 (e.g., access terminal 1120B). In some aspects, communication of the access terminal 1120 with the femto node 1110 and/or the access point 1160 may be in a TVWS after enablement of the access terminal 1120. Communications between a femto node 1110 and a database may be over the network 1140 or 1150 in some aspects.

Figure 12:
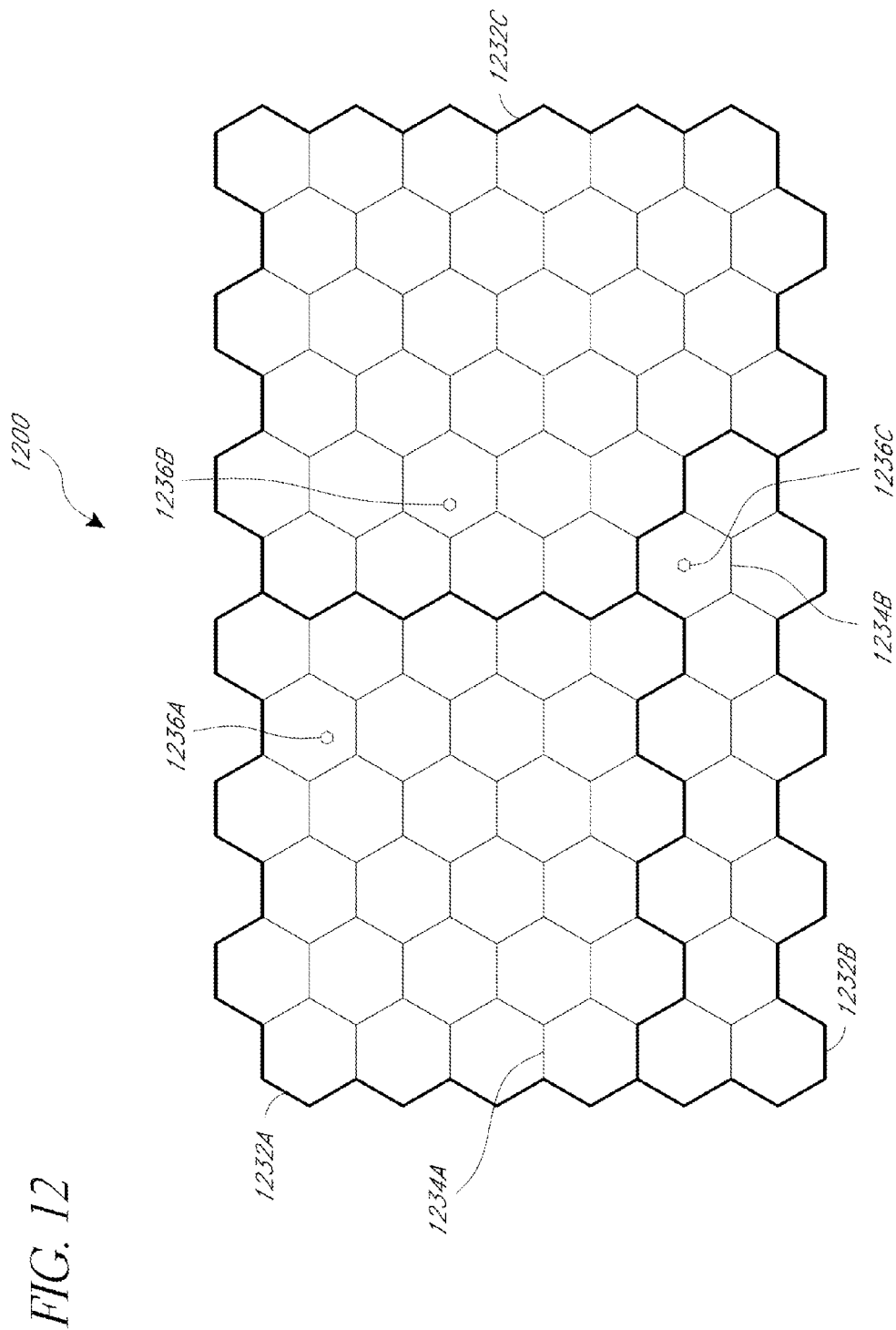
FIG. 12 is a simplified diagram illustrating coverage areas for wireless communication.

FIG. 12 is a simplified diagram illustrating an example of a coverage map 1200 where several tracking areas 1202 (or routing areas or location areas) are defined, each of which includes several macro coverage areas 1204. Here, areas of coverage associated with tracking areas 1202A, 1202B, and 1202C are delineated by the wide lines and the macro coverage areas 1204 are represented by the hexagons. The tracking areas 1202 also include femto coverage areas 1206. In this example, each of the femto coverage areas 1206 (e.g., femto coverage area 1206C) is depicted within a macro coverage area 1204 (e.g., macro coverage area 1204B). It should be appreciated, however, that a femto coverage area 1206 may not lie entirely within a macro coverage area 1204. In practice, a large number of femto coverage areas 1206 may be defined with a given tracking area 1202 or macro coverage area 1204. Also, one or more pico coverage areas (not shown) may be defined within a given tracking area 1202 or macro coverage area 1204. Each of the femto coverage areas 1204 may be served by a femto node, such as the femto node 1110 discussed above.

Referring again to FIG. 11, the owner of a femto node 1110 may subscribe to a mobile service, such as, for example, 3G mobile service, offered through the mobile operator core network 1150. In addition, an access terminal 1120 may be capable of operating both in macro environments and in smaller scale (e.g., residential) network environments. In other words, depending on the current location of the access terminal 1120, the access terminal 1120 may be served by a macro cell access point 1160 associated with the mobile operator core network 1150 or by any one of a set of femto nodes 1110 (e.g., the femto nodes 1110A and 1110B that reside within a corresponding user residence 1130). For example, when a subscriber is outside his home, he may be served by a standard macro access point (e.g., access point 1160) and when the subscriber is at home, he may be served by a femto node (e.g., node 1110A). Here, it should be appreciated that a femto node 1110 may be backward compatible with existing access terminals 1120.

A femto node 1110 may be deployed on a single frequency or, in the alternative, on multiple frequencies. Depending on the particular configuration, the single frequency or one or more of the multiple frequencies may overlap with one or more frequencies used by a macro access point (e.g., access point 1160).

For convenience, the disclosure related to FIGS. 10-12 describes various functionality in the context of a femto node. It should be appreciated, however, that a pico node may provide the same or similar functionality for a larger coverage area. For example, a pico node may be restricted, a home pico node may be defined for a given access terminal, and so on. Similarly, other nodes or networks may be employed, as discussed above. The examples shown in FIGS. 10-12 are not limiting on any implementations of the systems or devices described herein.

A wireless multiple-access communication system may simultaneously support communication for multiple wireless access terminals. As mentioned above, each terminal may communicate with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-in-single-out system, a multiple-in-multiple-out (MIMO) system, or some other type of system.

A MIMO system may employ multiple (NT) transmit antennas and multiple(NR) receive antennas for data transmission. A MIMO channel formed by the NT transmit and NR receive antennas may be decomposed into NS independent channels, which are also referred to as spatial channels, where NS≤min {NT, NR}. Each of the NS independent channels corresponds to a dimension. The MIMO system may provide improved performance (e.g., higher throughput and/ or greater reliability) if the additional dimensionalities created by the multiple transmit and receive antennas are utilized.

A MIMO system may support time division duplex (TDD) and frequency division duplex (FDD). In a TDD system, the forward and reverse link transmissions are on the same frequency region so that the reciprocity principle allows the estimation of the forward link channel from the reverse link channel. This enables the access point to extract transmit beam-forming gain on the forward link when multiple antennas are available at the access point.

Figure 13:
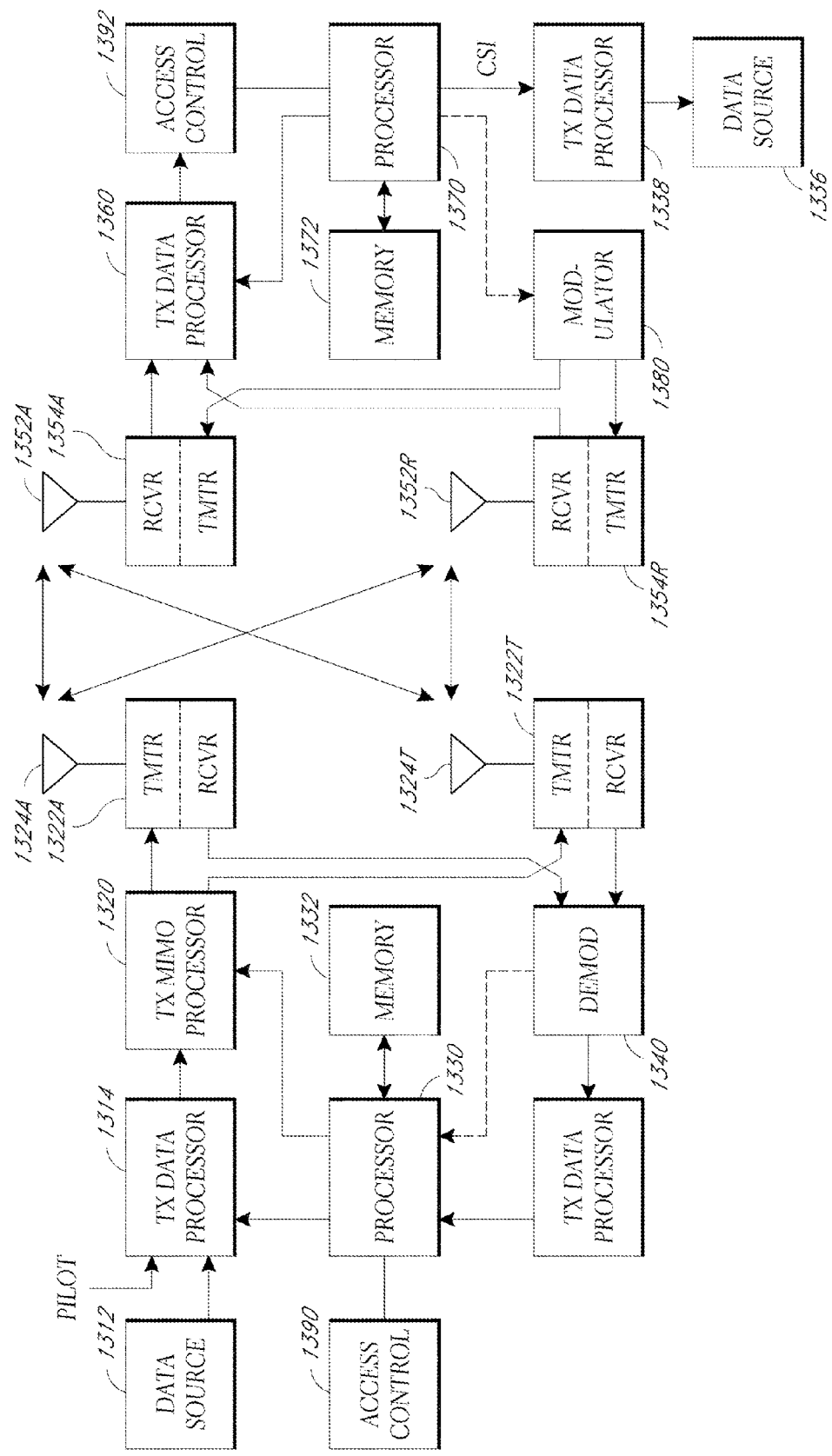
FIG. 13 is a simplified block diagram of several sample aspects of communication components.

The teachings herein may be incorporated into a node (e.g., a device) employing various components for communicating with at least one other node. FIG. 13 depicts several sample components that may be employed to facilitate communication between nodes. Specifically, FIG. 13 is a simplified block diagram of a first wireless device 1310 (e.g., an access point) and a second wireless device 1350 (e.g., an access terminal) of a MIMO system 1300. At the first device 1310, traffic data for a number of data streams is provided from a data source 1312 to a transmit (TX) data processor 1314.

In some aspects, each data stream is transmitted over a respective transmit antenna. The TX data processor 1314 formats, codes, and interleaves the traffic data for each data stream based on a particular coding scheme selected for that data stream to provide coded data. The TX data processor 1314 may be implemented in the processing module 305 or 804, for example, or in the transceiver 303, 307, or 802, for example.

The coded data for each data stream may be multiplexed using OFDM techniques. The multiplexed and/or coded data for each data stream may be modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by a processor 1330. The processor may be implemented in the processing module 305 or 804, for example. A data memory 1332 may store program code, data, and other information used by the processor 1330 or other components of the device 1310.

The modulation symbols for all data streams are may be provided to a TX MIMO processor 1320, which may further process the modulation symbols (e.g., for OFDM). The TX MIMO processor 1320 may provide NT modulation symbol streams to NT transceivers (XCVR) 1322A through 1322T. In some aspects, the TX MIMO processor 1320 applies beam-forming weights to the symbols of the data streams and to the antenna from which the symbol is being transmitted. In some aspects, the TX MIMO processor 1320 is omitted, for example when MIMO is not utilized.

Each transceiver 1322 receives and processes a respective symbol stream to provide one or more analog signals, and further conditions (e.g., amplifies, filters, and upconverts) the analog signals to provide a modulated signal suitable for transmission over the channel. NT modulated signals from transceivers 1322A through 1322T may be transmitted from NT antennas 1324A through 1324T, respectively. The transceiver 1322 may be implemented in the transceiver 303, 307, or 802.

At the second device 1350, the transmitted modulated signals may be received by NR antennas 1352A through 1352R and the received signal from each antenna 1352 provided to a respective transceiver (XCVR) 1354A through 1354R. Each transceiver 1354 conditions (e.g., filters, amplifies, and downconverts) a respective received signal, digitizes the conditioned signal to provide samples, and further processes the samples to provide a corresponding "received" symbol stream. The transceiver 1322 may be implemented in the transceiver 303, 307, or 802.

A receive (RX) data processor 1360 may receive and process the NR received symbol streams from NR transceivers 1354 based on a particular receiver processing technique to provide NT "detected" symbol streams. The RX data processor 1360 then demodulates, deinterleaves, and decodes each detected symbol stream to recover the traffic data for the data stream. The processing by the RX data processor 1360 may be complementary to that performed by the TX MIMO processor 1320 and the TX data processor 1314 at the device 1310. The RX data processor 1360 may be implemented in the processing module 305 or 804, for example.

A processor 1370 may determine a pre-coding matrix to use. The processor 1370 may be implemented in the processing module 305 or 804, for example. A data memory 1372 may store program code, data, and other information used by the processor 1370 or other components of the second device 1350.

At the device 1310, the modulated signals from the second device 1350 may be received by the antennas 1324, conditioned by the transceivers 1322, demodulated by a demodulator (DEMOD) 1340, and processed by a RX data processor 1342. The antennas 1324 may be implemented by one or more of the antennas 302 and 304. Similarly, the antennas 1352 may be implemented by one or more of the antennas 302 and 304.

FIG. 13 also illustrates that the communication components may include one or more components that perform various transmit or control operations as taught herein. For example, an access control component 1390 may cooperate with the processor 1330 and/or other components of the device 1310 to send/receive signals to/from another device (e.g., device 1350) as taught herein. Similarly, an access control component 1392 may cooperate with the processor 1370 and/or other components of the device 1350 to send/receive signals to/from another device (e.g., device 1310). It should be appreciated that for each device 1310 and 1350 the functionality of two or more of the described components may be provided by a single component. For example, a single processing component may provide the functionality of the access control component 1390 and the processor 1330 and a single processing component may provide the functionality of the access control component 1392 and the processor 1370.

Figure 14:
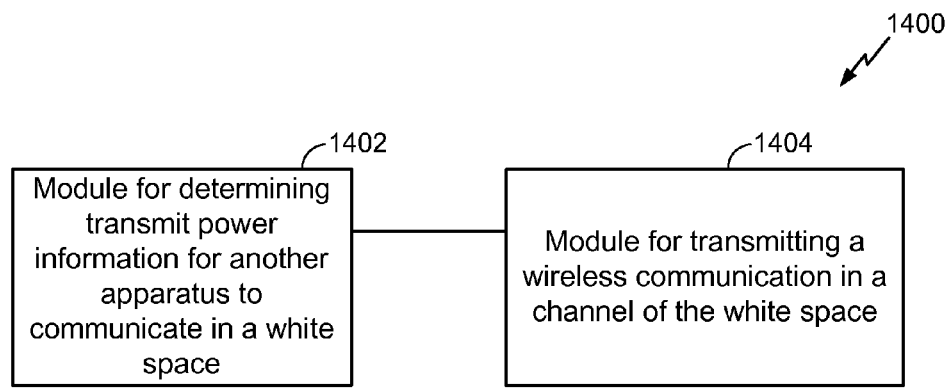
FIG. 14 is a functional block diagram of another exemplary wireless device that may be employed within the wireless communication system of FIG. 1.

FIG. 14 is a functional block diagram of another exemplary wireless device 1400 that may be employed within the wireless communication system of FIG. 1. The device 1400 comprises a module 1402 for determining transmit power information for another apparatus to communicate in a white space. The module 1402 may be configured to perform one or more of the functions discussed above with respect to the block 706 illustrated in FIG. 7. The module 1402 may comprise the processing module 305. The module 1402 may further comprise one or more of the processors 1330 or 1370, transmit data processors 1314 or 1338 or 1360, transmit MIMO processor 1320, or access control 1390.

The device 1400 further comprises a module 1404 for transmitting a wireless communication in a channel of the white space. The wireless communication may authorize an initial transmission by the other apparatus and identify the transmit power information. The module 1404 may be configured to perform one or more of the functions discussed above with respect to the block 708 illustrated in FIG. 7. The module 1404 may comprise the white space transceiver 307. The module 1404 may further comprise one or more of the transceivers 1324 or 1352.

Figure 15:
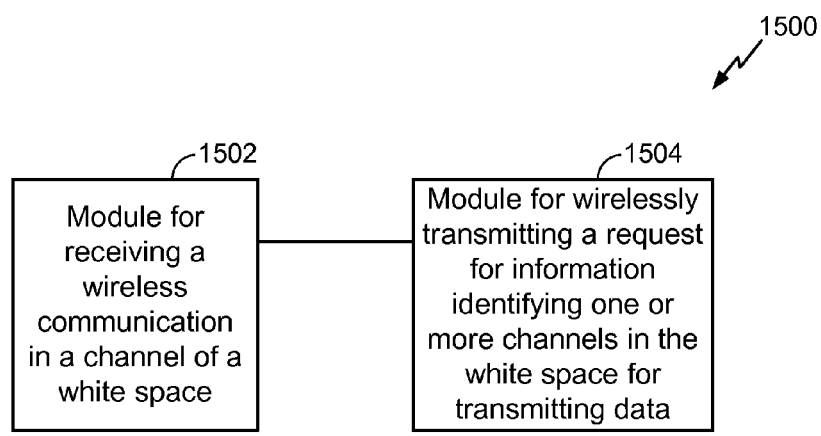
FIG. 15 is a functional block diagram of yet another exemplary wireless device that may be employed within the wireless communication system of FIG. 1.

FIG. 15 is a functional block diagram of yet another exemplary wireless device 1500 that may be employed within the wireless communication system of FIG. 1. The device 1500 comprises a module 1502 for receiving a wireless communication in a channel of a white space. The wireless communication may authorize an initial transmission and identify transmit power information for communicating in the white space. The module 1502 may be configured to perform one or more of the functions discussed above with respect to the block 902 illustrated in FIG. 9A. The module 1502 may comprise the white space transceiver 802. The module 1502 may further comprise one or more of the transceivers 1324 or 1352.

The device 1500 further comprises a module 1504 for wirelessly transmitting a request for information identifying one or more channels in the white space for transmitting data. The request may be transmitted with a power that is based at least in part on the transmit power information received in the wireless communication. The module 1504 may be configured to perform one or more of the functions discussed above with respect to the block 904 illustrated in FIG. 9A. The module 1504 may comprise the white space transceiver 802. The module 1504 may further comprise one or more of the transceivers 1324 or 1352.

One having ordinary skill in the art will appreciate that the systems, methods, and devices described herein may communicate in a white space such as a TVWS. The various devices may be configured to request enablement from a database, for example as managed by the FCC. In some aspects, a communication authorizing an initial transmission may include power information for the initial transmission so that a device starting a boot strapped procedure of enablement may determine a transmit power.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

In one or more aspects, the functions described may be implemented in hardware, software, firmware, or any combination thereof If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Thus, in some aspects computer readable medium may comprise non-transitory computer readable medium (e.g., tangible media). In addition, in some aspects computer readable medium may comprise transitory computer readable medium (e.g., a signal). Combinations of the above should also be included within the scope of computer-readable media.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to aspects of the present disclosure, other and further aspects of the disclosure may be devised without departing from the basic scope thereof, and the scope thereof is determined by the claims that follow.

What is claimed is:

1. An apparatus for wireless communication, comprising:
   a receiver configured to receive a wireless communication in a channel of a white space, the wireless communication authorizing an initial transmission and identifying transmit power information for communicating in the white space; and
   a transmitter configured to wirelessly transmit a request for information identifying one or more channels in the white space for transmitting data, the request being transmitted with a power that is based at least in part on the transmit power information received in the wireless communication, wherein the transmit power information identifies a plurality of transmission channels, a maximum transmit power for each of the plurality of transmission channels, and a plurality of device types for at least one of the plurality of transmission channels.

2. The apparatus of claim 1, wherein the white space comprises a television white space (TVWS).

3. The apparatus of claim 1, wherein the wireless communication comprises a beacon.

4. The apparatus of claim 3, wherein the beacon comprises at least one of a plurality of information elements (IEs), wherein the at least one IE comprises an identifier (ID) signifying that the initial transmission is authorized.

5. The apparatus of claim 4, wherein the IE comprises a field indicating a length of the IE.

6. The apparatus of claim 4, wherein the IE comprises a field identifying the transmit power information.

7. The apparatus of claim 1, wherein the transmit power information indicates a single maximum transmit power for all devices receiving the wireless communication.

8. The apparatus of claim 7, wherein the receiver is configured to receive the wireless communication over a first channel, and wherein the transmitter is configured to wirelessly transmit the signal in the white space over the first channel at a power that is less than or equal to the maximum transmit power.

9. The apparatus of claim 1, wherein the transmit power information further identifies a maximum transmit power for each of the plurality of device types.

10. The apparatus of claim 9, wherein the receiver is configured to receive the wireless communication over a first channel, wherein the apparatus further comprises a processor configured to select at least one type of the plurality of device types and a respective maximum transmit power corresponding to the at least one type, and wherein the transmitter is configured to wirelessly transmit the signal in the white space over the first channel at a power that is less than or equal to the respective maximum transmit power.

11. The apparatus of claim 1, wherein the transmit power information identifies a single maximum transmit power for each of the plurality of transmission channels.

12. The apparatus of claim 1, wherein the transmit power information comprises an operating class comprising an index into a table of maximum transmit powers.

13. The apparatus of claim 1, where in the wireless communication comprises a broadcast communication.

14. The apparatus of claim 1, wherein the wireless communication is received from a transmitting device, and wherein the transmitter is configured to wirelessly transmit the request to the transmitting device.

15. A method of wireless communication, comprising:
receiving a wireless communication in a channel of a white space, the wireless communication authorizing an initial transmission and identifying transmit power information for communicating in the white space; and
wirelessly transmitting a request for information identifying one or more channels in the white space for transmitting data, the request being transmitted with a power that is based at least in part on the transmit power information received in the wireless communication, wherein the transmit power information identifies a plurality of transmission channels, a maximum transmit power for each of the plurality of transmission channels, and a plurality of device types for at least one of the plurality of transmission channels.

16. The method of claim 15, wherein the white space comprises a television white space (TVWS).

17. The method of claim 15, wherein the wireless communication comprises a beacon.

18. The method of claim 17, wherein the beacon comprises at least one of a plurality of information elements (IEs), wherein the at least one IE comprises an identifier (ID) signifying that the initial transmission is authorized.

19. The method of claim 18, wherein the IE comprises a field indicating a length of the IE.

20. The method of claim 18, wherein the IE comprises a field identifying the transmit power information.

21. The method of claim 15, wherein the transmit power information indicates a single maximum transmit power for all devices receiving the wireless communication.

22. The method of claim 21, wherein the receiving comprises receiving the wireless communication over a first channel, and wherein the transmitting comprises wirelessly transmitting the signal in the white space over the first channel at a power that is less than or equal to the maximum transmit power.

23. The method of claim 15, wherein the transmit power information further identifies a maximum transmit power for each of the plurality of device types.

24. The method of claim 23, wherein the receiving comprises receiving the wireless communication over a first channel, wherein the method further comprises selecting at least one type of the plurality of device types and a respective maximum transmit power corresponding to the at least one type, and wherein the transmitting comprises wirelessly transmitting the signal in the white space over the first channel at a power that is less than or equal to the respective maximum transmit power.

25. The method of claim 15, wherein the transmit power information identifies a single maximum transmit power for each of the plurality of transmission channels.

26. The method of claim 15, wherein the transmit power information comprises an operating class comprising an index into a table of maximum transmit powers.

27. The method of claim 15, where in the wireless communication comprises a broadcast communication.

28. The method of claim 15, wherein the receiving comprises receiving the wireless communication from a transmitting device, and wherein the transmitting comprises wirelessly transmitting the request to the transmitting device.

29. An apparatus for wireless communication, comprising:
means for receiving a wireless communication in a channel of a white space, the wireless communication authorizing an initial transmission and identifying transmit power information for communicating in the white space; and
means for wirelessly transmitting a request for information identifying one or more channels in the white space for transmitting data, the request being transmitted with a power that is based at least in part on the transmit power information received in the wireless communication, wherein the transmit power information identifies a plurality of transmission channels, a maximum transmit power for each of the plurality of transmission channels, and a plurality of device types for at least one of the plurality of transmission channels.

30. A non-transitory computer readable medium comprising instructions that when executed cause an apparatus to:
receive a wireless communication in a channel of a white space, the wireless communication authorizing an initial transmission and identifying transmit power information for communicating in the white space; and
wirelessly transmit a request for information identifying one or more channels in the white space for transmitting data, the request being transmitted with a power that is based at least in part on the transmit power information received in the wireless communication, wherein the transmit power information identifies a plurality of transmission channels, a maximum transmit power for each of the plurality of transmission channels, and a plurality of device types for at least one of the plurality of transmission channels.

31. An apparatus for wireless communication, comprising:
a processor configured to determine transmit power information for another apparatus to communicate in a white space;
a transmitter configured to transmit a wireless communication in a channel of the white space, the wireless communication authorizing an initial transmission by the other apparatus and identifying the transmit power information; and a receiver configured to wirelessly receive a message from the other apparatus over a channel in the white space in response to the transmitted wireless communication, the message requesting information identifying one or more channels in the white space over which the other apparatus is permitted to transmit data.

32. The apparatus of claim 31, wherein the receiver is further configured to receive information identifying one or more channels in the white space which the apparatus is authorized to transmit data over, and configured to receive a power management element for at least one channel of the one or more channels, wherein the transmit power information is based at least in part on the power management element.

33. The apparatus of claim 32, wherein the receiver is configured to receive the identifying information over a wired or wireless channel outside of the white space.

34. The apparatus of claim 32, comprising a transmitter configured to query a database for permission to transmit data in the white space, the query being transmitted over a wired or wireless channel outside of the white space, and the identifying information being received in response to the query.

35. The apparatus of claim 31, wherein the transmitter is configured to transmit the wireless communication over a first channel in the white space, and wherein the receiver is configured to wirelessly receive the message over the first channel.

36. The apparatus of claim 31, wherein the transmitter is configured to transmit the wireless communication over a first channel in the white space, and wherein the receiver is configured to wirelessly receive the message over a second channel in the white space, the second channel being distinct from the first channel.

37. The apparatus of claim 31, wherein the wireless communication comprises a beacon, and wherein the transmitter is configured to broadcast the wireless communication.

38. The apparatus of claim 31, wherein the transmit power information indicates a single maximum transmit power for all devices receiving the wireless communication.

39. The apparatus of claim 38, wherein the processor is configured to determine the single maximum transmit power based on a power used by the transmitter to transmit the wireless communication.

40. The apparatus of claim 38, wherein the processor is configured to identify a plurality of powers for communicating in the white space, and to select one of the plurality of powers as the single maximum transmit power.

41. The apparatus of claim 31, wherein the transmit power information identifies a plurality of device types, and further identifies a maximum transmit power for each of the plurality of device types.

42. The apparatus of claim 31, wherein the transmit power information identifies a plurality of transmission channels, and further identifies a maximum transmit power for each of the plurality of transmission channels.

43. The apparatus of claim 42, wherein the transmit power information identifies a single maximum transmit power for each of the plurality of transmission channels.

44. The apparatus of claim 42, wherein the transmit power information further identifies a plurality of device types for at least one of the plurality of transmission channels, and a maximum transmit power for each of the plurality of transmission channels.

45. The apparatus of claim 31, wherein the transmit power information comprises an operating class comprising an index into a table of maximum transmit powers.

46. The apparatus of claim 31, wherein the white space comprises a television white space (TVWS).

47. A method of wireless communication, comprising:
determining transmit power information for another apparatus to communicate in a white space;
transmitting a wireless communication in a channel of the white space, the wireless communication authorizing an initial transmission by the other apparatus and identifying the transmit power information; and
wirelessly receiving a message from the other apparatus over a channel in the white space in response to the transmitted wireless communication, the message requesting information identifying one or more channels in the white space over which the other apparatus is permitted to transmit data.

48. The method of claim 47, further comprising receiving information identifying one or more channels in the white space which the apparatus is authorized to transmit data over, and receiving a power management element for at least one channel of the one or more channels, wherein the transmit power information is based at least in part on the power management element.

49. The method of claim 48, wherein receiving the identifying information comprising receiving the identifying information over a wired or wireless channel outside of the white space.

50. The method of claim 48, further comprising querying a database for permission to transmit data in the white space, the query being transmitted over a wired or wireless channel outside of the white space, and the identifying information being received in response to the query.

51. The method of claim 47, wherein the transmitting comprises transmitting the wireless communication over a first channel in the white space, and wherein the receiving comprises wirelessly receiving the message over the first channel.

52. The method of claim 47, wherein the transmitting comprises transmitting the wireless communication over a first channel in the white space, and wherein the receiving comprises wirelessly receiving the message over a second channel in the white space, the second channel being distinct from the first channel.

53. The method of claim 47, wherein the wireless communication comprises a beacon, and wherein the transmitting comprises broadcasting the wireless communication.

54. The method of claim 47, wherein the transmit power information indicates a single maximum transmit power for all devices receiving the wireless communication.

55. The method of claim 54, wherein the determining comprises determining the single maximum transmit power based on a power used for the transmitting.

56. The method of claim 54, wherein the determining comprises identifying a plurality of powers for communicating in the white space, and selecting one of the plurality of powers as the single maximum transmit power.

57. The method of claim 47, wherein the transmit power information identifies a plurality of device types, and further identifies a maximum transmit power for each of the plurality of device types.

58. The method of claim 47, wherein the transmit power information identifies a plurality of transmission channels, and further identifies a maximum transmit power for each of the plurality of transmission channels.

59. The method of claim 58, wherein the transmit power information identifies a single maximum transmit power for each of the plurality of transmission channels.

60. The method of claim 58, wherein the transmit power information further identifies a plurality of device types for at least one of the plurality of transmission channels, and a maximum transmit power for each of the plurality of transmission channels.

61. The method of claim 47, wherein the transmit power information comprises an operating class comprising an index into a table of maximum transmit powers.

62. The method of claim 47, wherein the white space comprises a television white space (TVWS).

63. An apparatus for wireless communication, comprising:
   means for determining transmit power information for another apparatus to communicate in a white space;
   means for transmitting a wireless communication in a channel of the white space, the wireless communication authorizing an initial transmission by the other apparatus and identifying the transmit power information; and
   means for receiving a message from the other apparatus over a channel in the white space in response to the transmitted wireless communication, the message requesting information identifying one or more channels in the white space over which the other apparatus is permitted to transmit data.

64. A non-transitory computer readable medium comprising instructions that when executed cause an apparatus to:
   determine transmit power information for another apparatus to communicate in a white space;
   transmit a wireless communication in a channel of the white space, the wireless communication authorizing an initial transmission by the other apparatus and identifying the transmit power information; and
   wirelessly receive a message from the other apparatus over a channel in the white space in response to the transmitted wireless communication, the message requesting information identifying one or more channels in the white space over which the other apparatus is permitted to transmit data.

\* \* \* \* \*